US007143001B2

(12) United States Patent
Karasek

(10) Patent No.: US 7,143,001 B2
(45) Date of Patent: Nov. 28, 2006

(54) METHOD FOR MONITORING OPERATING CHARACTERISTICS OF A SINGLE AXIS MACHINE

(75) Inventor: Milan Karasek, Kolin (CZ)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 120 days.

(21) Appl. No.: 10/896,573

(22) Filed: Jul. 21, 2004

(65) Prior Publication Data

US 2006/0020416 A1 Jan. 26, 2006

(51) Int. Cl.
*G01P 15/00* (2006.01)

(52) U.S. Cl. .................................................... 702/141

(58) Field of Classification Search ................. 702/141
See application file for complete search history.

(56) References Cited

U.S. PATENT DOCUMENTS

| | | | | | |
|---|---|---|---|---|---|
| 4,085,363 | A | * | 4/1978 | Gravina et al. | 324/162 |
| 4,128,888 | A | * | 12/1978 | Sheldon et al. | 702/9 |
| 4,880,082 | A | | 11/1989 | Kahkipuro et al. | |
| 5,166,882 | A | | 11/1992 | Stambaugh | |
| 5,856,802 | A | | 1/1999 | Ura et al. | |
| 5,960,376 | A | * | 9/1999 | Yamakado et al. | 702/141 |
| 6,199,020 | B1 | * | 3/2001 | Ando | 702/41 |
| 6,571,193 | B1 | * | 5/2003 | Unuma et al. | 702/141 |
| 6,928,382 | B1 | * | 8/2005 | Hong et al. | 702/141 |
| 2003/0233175 | A1 | | 12/2003 | Giraudy et al. | |

FOREIGN PATENT DOCUMENTS

| | | | |
|---|---|---|---|
| DE | 195 02 798 | A1 | 8/1996 |
| DE | 101 50 284 | A1 | 4/2003 |
| WO | WO 01/14237 | A1 | 3/2001 |

* cited by examiner

*Primary Examiner*—John Barlow
*Assistant Examiner*—Jonathan Moffat
(74) *Attorney, Agent, or Firm*—Quarles & Brady LLP; Alexander R. Kuszewski

(57) ABSTRACT

A method for use with an accelerometer that monitors movement of a machine component and generates acceleration values that include at least some noise associated therewith, the method for tracking machine component velocity via the acceleration values, the method comprising the steps of obtaining acceleration values from the accelerometer during machine operation, analyzing the acceleration values to distinguish noise signals from non-noise signals wherein a noise signal is an acceleration value likely solely attributable to noise, using the non-noise signals to identify a component velocity value and performing a secondary function to identify component velocity when noise signals are identified. The invention also contemplates a processor to perform the inventive methods.

45 Claims, 14 Drawing Sheets

METHOD FOR MONITORING OPERATING CHARACTERISTICS OF A SINGLE AXIS MACHINE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates generally to systems for collecting information regarding operating characteristics of machine components for diagnostic purposes and more specifically to algorithms used with accelerometers that track acceleration of machine components, the algorithms useable to increase accelerometer accuracy, minimize the effects of noise and to generate relatively accurate velocity and position information as well as state information for the components based on the acceleration values and known information regarding component operating characteristics (e.g., operating states, possible state transitions, condition-state singularities, etc.).

Many automated systems include mechanical machine components that are controlled to move with respect to each other to perform a task. For example, in the case of automated manufacturing, machines and machine components are routinely mounted for sliding motion with respect to other machines and components to perform related tasks. As another instance, elevator cars are typically mounted on tracks for movement between floors of buildings and elevator doors are likewise mounted on tracks for movement between open and closed positions. Hereinafter, while the present invention is applicable to many different applications where one machine component moves with respect to others, in order to simplify this explanation, the problems solved by the present invention and the inventive aspects themselves will be described in the context of an exemplary elevator including a car and a car door where the elevator is mounted for movement between ten floors of a building and where the door is mounted for movement between open and closed positions, the door including a leading edge that travels at least in part along a door sash within the door opening when moving from a closed position into an open position.

When designing any elevator and elevator control system, certain criteria are important. To this end, some important criteria include smoothness of operation, robustness and operating speed. With respect to smoothness of operation, elevator car movements should be as smooth as possible to avoid injuring passengers inside the elevator car and to minimize the feeling of movement thereby enhancing passenger comfort. Thus, for instance, during normal elevator operation, to move an elevator car from a stationary position at an initial floor to a stationary position at a final floor, car velocity should be increased gradually up to a constant traveling velocity and, prior to reaching the final floor, the velocity should be ramped down gradually.

With respect to robustness, while elevator components are often designed to be extremely durable while operating under various conditions, components are typically designed to operate best under a specific set of circumstances. To this end, in the case of an elevator car door, wear and tear can be minimized by controlling door movements so that the door stops and commences movement relatively smoothly. Similarly, smooth car movements typically prolong the useful life of a car and supporting components. Control algorithms can be designed to facilitate sustainable car and door operations by commanding smooth and essentially ideal movements where car and door velocities ramp up and down along ideal curves.

With respect to operating speed, elevator components should move as quickly as possible without affecting the riding comfort of passengers therein and without unduly affecting wear and tear on components. For example, in the case of the elevator car, while velocity should ramp up and down at the beginning and end of a travel cycle, the ramp phases of travel should be as short as possible and the constant velocity phase should have a velocity as high as possible without affecting ride comfort or component durability. Similarly, in the case of an elevator door, the up and down velocity ramp phases should be as steep as possible without unduly adversely affecting component durability and passenger safety.

While ideal or optimal control algorithms have been developed for specific elevator configurations that properly balance each of the smoothness, robustness and speed considerations, unfortunately, over time all mechanical components experience wear and tear that affect operating characteristics and that therefore require maintenance or replacement. Hereinafter the general condition of elevator components or systems will be referred to as the "health" of the component or system unless indicated otherwise.

One way to monitor elevator component and system health has been to employ servicemen to periodically visit elevators and to manually test operating characteristics to identify any tell tail signs of impending maintenance problems. Systems that rely on service visits to evaluate system health have several shortcomings. First, service visits are relatively expensive as servicemen typically require specialized training in all aspects of system operation. In addition, service visits are usually expensive as, most of the time, a system checkup will reveal that the elevator system is healthy and that no maintenance is required.

Second, while service visits can be used to determine system health at the time of the visit, the information generated during a service visit represents only a snap shot in time of system operation which may not reveal operational nuances that occur at other operating times and from which long term operating trends cannot be identified.

Third, in some cases operating characteristics can degrade relatively quickly and, in any event, between health checkups. Here, where operating characteristics degrade rapidly prior to a next checkup, degrading operation may cause excessive and undue damage to components as well as noticeably adversely affect elevator operating characteristics such as smoothness and speed.

One solution to the diagnostic problem described above has been to provide a diagnostic assembly including system sensors, a processor and a database wherein the processor routinely monitor system operating characteristics via the sensors and stores the characteristics in the database. Thereafter, the processor or another processor may be programmed to process and analyze the stored data to identify any nuances that may indicate degradation in system health and to provide warnings when a system should be services. While various types of data can be monitored and stored for subsequent analysis, some particularly useful types of information include velocities of component travel, component positions and, in at least some cases, component operating states (e.g., in the case of an elevator car, standing, accelerating, constant velocity, decelerating, emergency stop).

At least some diagnostic assemblies include one or more accelerometers to generate the data required to monitor system health. For instance, a first accelerometer may be mounted to an elevator car to monitor elevator car acceleration and to generate acceleration values indicative thereof while a second accelerometer may be mounted to or adjacent a car door to monitor door acceleration and generate acceleration values indicating door acceleration. Here, door velocity can be determined by integrating the acceleration values and position can be determined by integrating the velocity values.

Exemplary accelerometers measure acceleration and generate an output voltage u that is proportional thereto. Here, the output voltage u is related to the actual component acceleration by an accelerometer gain value $g_h$ (i.e., $u=ag_h$). Thus, to identify an instantaneous acceleration value using output voltage u, a processor receiving value u runs software and divides the output voltage value u (i.e., $a=u/m_c$) by a modifier $m_c$ where modifier $m_c$ is set equal to $g_h$.

While accelerometers can be used to generate useful information, it has been observed that typical acceleration values often include a large noise component which results in operating characteristic data that does not accurately reflect operation of the system. For instance, when an elevator car is stationary (i.e., the velocity is zero), often an accelerometer will nevertheless generate a noise signal that, when integrated, indicates at least some car velocity and hence a changing car position—clearly an erroneous determination. Because integrating processes to identify velocity and position assume initial velocities and positions, errors due to noise accumulate and become greater over time.

In addition, unfortunately, accelerometer gain $g_h$ has been known to change with temperature, long term use, etc. and therefore, while modifier value $m_c$ used by the software program run by the processor may initially be accurate (i.e., $m_c=g_h$ initially), over time, as gain $g_h$ changes (i.e., $m_c \neq g_h$) and the accuracy of the acquired signal is reduced.

Thus, it would be advantageous to have an accelerometer based system that employs algorithms useable to increase accelerometer accuracy, minimize the effects of noise and to generate relatively accurate velocity and position information as well as state information for machine components based on the acceleration values as well as minimal information regarding component operating characteristics. In addition, it would be advantageous to have a system that automatically follows changes in accelerometer gains when accuracy drifts.

BRIEF SUMMARY OF THE INVENTION

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

It has been recognized that the output signals generated by accelerometers often include too much noise to be useful in and of themselves but that absence of useful signals or presence of noisy signals can be combined with other system operating characteristics to generate relatively accurate information regarding operation of a moving component. The other information may take any of several different forms including known operating states and transition states for the component, which states can follow other states, how the component moves during normal operation (i.e., normal acceleration and velocity patterns, normal stationary positions, end or limit positions, etc.) and so on.

The invention includes a method for use with an accelerometer that monitors movement of a machine component and generates acceleration values that include at least some noise associated therewith, the method for tracking machine component velocity via the acceleration values, the method comprising the steps of obtaining acceleration values from the accelerometer during machine operation, analyzing the acceleration values to distinguish noise signals from non-noise signals wherein a noise signal is an acceleration value likely solely attributable to noise, using the non-noise signals to identify a component velocity value and performing a secondary function to identify component velocity when noise signals are identified.

The invention also includes a method for use with an accelerometer that monitors movement of a machine component and generates acceleration values that include at least some noise associated therewith, the method comprising the steps of providing machine configuration information indicating positions the component may occupy when the component is stationary, obtaining acceleration values during machine operation that indicate acceleration of the machine component, using the acceleration values to identify component velocity values reflecting component velocity and, when the velocity values reflect that the component is stationary, using the machine configuration information to identify the position of the component.

In addition, at least some embodiments of the invention include a method for use with an accelerometer that monitors movement of a machine component and generates acceleration values that include at least some noise associated therewith, the component having a plurality of operating states, the method for identifying operating states as a function of acceleration value characteristics and comprising the steps of providing machine operating information specifying operating states and corresponding acceleration value characteristics, obtaining acceleration values during machine operation that indicate acceleration of the component and using the operating information and the acceleration values to identify a current operating state of the component.

Moreover, some embodiment contemplate a method for use with an accelerometer that monitors movement of a machine component and generates acceleration values that include at least some noise associated therewith, the method for identifying component velocity and comprising the steps of obtaining acceleration values from the accelerometer during machine operation, analyzing the acceleration values to distinguish noise signals from non-noise signals wherein a noise signal is an acceleration value likely solely attributable to noise, integrating the non-noise signals to identify a component velocity value and disabling integration of the acceleration values when the acceleration values are noise signals.

Furthermore, some embodiments contemplate a method for use with an accelerometer that monitors movement of a machine component and generates acceleration values that include at least some noise associated therewith, the method comprising the steps of obtaining acceleration values during machine operation that indicate acceleration of the component, analyzing the acceleration values to distinguish noise signals, reliable signals and unclassified signals wherein a noise signal is an acceleration value likely solely attributable to noise, a reliable signals is that is likely attributable at least in part to other than noise and an unclassified signal is an acceleration value that is other than a noise value and a reliable signal, integrating the unclassified signals and the reliable signals to generate component velocity values and where the acceleration values are unclassified signals for a predetermined duration, modifying at least a subset of the velocity values.

According to one aspect of the invention a method is contemplated for use with an accelerometer that monitors movement of a machine component and generates acceleration values that include at least some noise associated therewith, the method comprising the steps of specifying machine operating characteristics that specify component boundary positions that indicate the positions of the component that cannot be surpassed during normal operation, obtaining acceleration values during machine operation that indicate acceleration of the component, integrating the acceleration values to identify integrated component velocity values, integrating the velocity values to identify integrated component positions, determining when the component is one of at and outside a boundary position and the velocity value is non-zero and when the component is one of at and beyond a boundary position and the velocity value is non-zero, modifying at least a subset of the velocity values.

According to another aspect some embodiments contemplate a method for use with a processor and an accelerometer that monitors movement of a machine component and generates accelerometer values that include at least some noise associated therewith, the processor receiving the accelerometer values and altering the accelerometer values as a function of a modifier value to generate acceleration values, the method for adjusting the modifier value and comprising the steps of providing machine configuration information that specifies a real distance between a first component position in which the component is stationary and a second component position in which the component is stationary, obtaining acceleration values during machine operation that indicate acceleration of the component, using the acceleration values to identify a calculated travel distance between at least the first and second component positions when the component is moved between the first and second positions and using the calculated travel distance to at least periodically alter the modifier value.

Other methods are for use with an accelerometer that monitors movement of a machine component and generates acceleration values that include at least some noise associated therewith, wherein the component has a plurality of operating states, the method also for identifying instantaneous component operating state as a function of acceleration value characteristics and most recent component operating state and comprising the steps of specifying operating characteristics that indicate operating states, possible operating states that can follow other operating states and component operating characteristic sets that indicate transitions between operating states, obtaining acceleration values during machine operation that indicate acceleration of the component, and using the acceleration values and the operating information to identify operating states.

The invention also contemplates apparatus for performing the inventive methods. One inventive apparatus is for use with an accelerometer that monitors movement of a machine component and generates acceleration values that include at least some noise associated therewith, the apparatus for tracking machine component velocity via the acceleration values, the apparatus comprising a processor running a program to perform the steps of: (a) obtaining acceleration values from the accelerometer during machine operation, (b) analyzing the acceleration values to distinguish noise signals from non-noise signals wherein a noise signal is an acceleration value likely solely attributable to noise, (c) using the non-noise signals to identify a component velocity value and (d) performing a secondary function to identify component velocity when noise signals are identified.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

BRIEF DESCRIPTION OF THE SEVERAL VIEWS OF THE DRAWINGS

The invention will hereafter be described with reference to the accompanying drawings, wherein like reference numerals denote like elements, and.

DETAILED DESCRIPTION OF THE INVENTION

Figure 1:
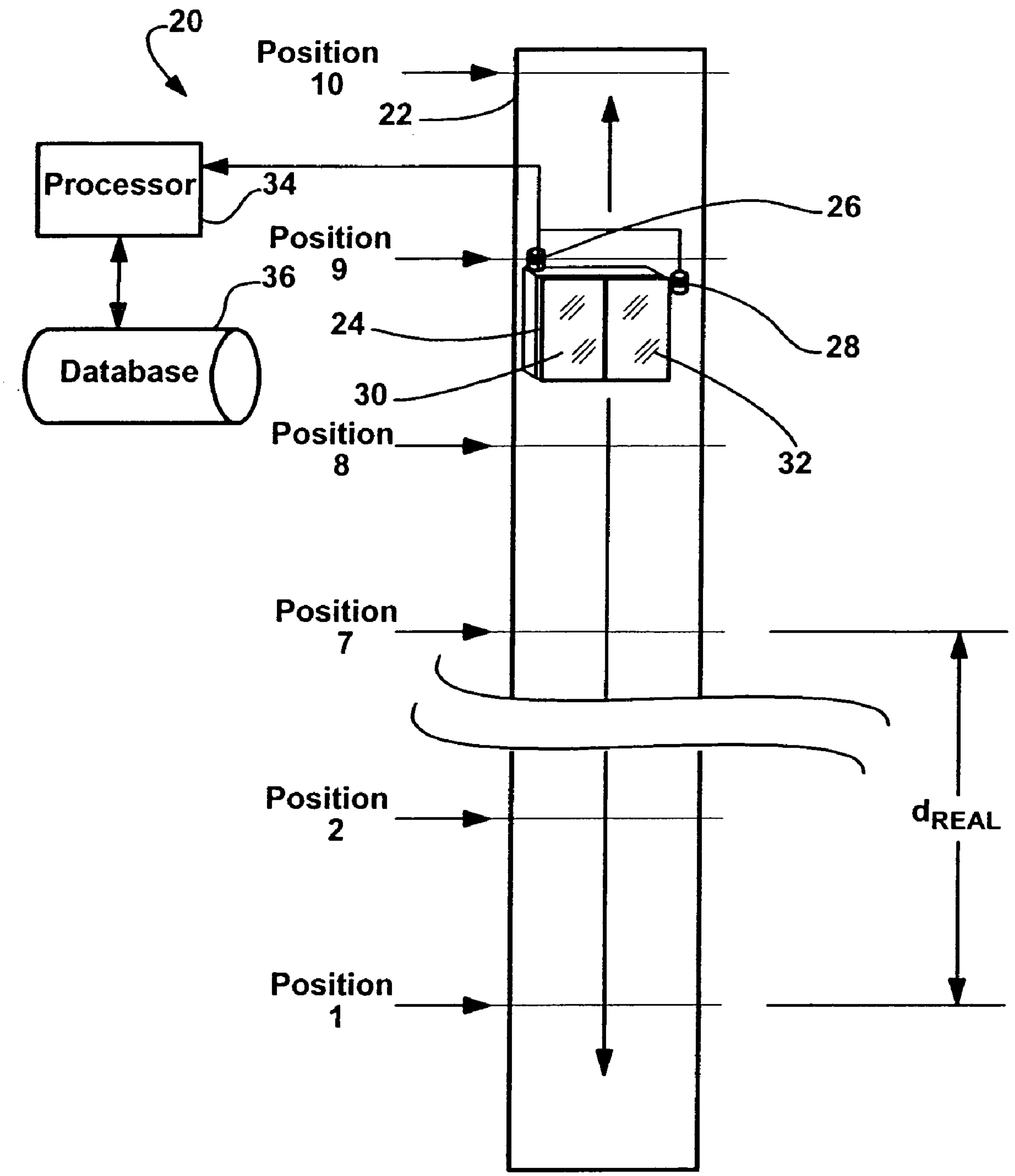
FIG. 1 is a schematic diagram of an exemplary elevator system including a processor programmed to certain aspects of the present invention.

One or more specific embodiments of the present invention will be described below. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

In the description that follows, an "a" is used to reference an acceleration value (e.g., an acceleration value generated by an accelerator), a "v" use to reference a velocity value or value, a "p" is used to reference a position value or value, an "m" is used to reference a modifier associated with accelerometer gain, a "$\sigma^2$" is used to reference a variance value, a "$\sigma$" is used to reference a standard deviation, a "thr" is used to reference a threshold value, a "d" is used to reference a distance value, a "t" is used to reference a time, an "os" is used to reference an operating state, a superscript "s" is used to reference a stationary value, a subscript number (e.g., 1, 2, etc.) is used to differentiate one signal or value from another signal or value having a different superscript number, a subscript "c" is used to reference a current signal or value, a subscript "i" is used to reference an intermediate signal or value, a subscript "$\mu$" is used to reference a bias value, a subscript "a" is used to reference an acceleration value, a subscript "v" is used to reference a velocity value or signal, a subscript "p" is used to reference a previous signal or value (i.e., the signal or value that proceeds another signal or value), a subscript "REAL" is used to reference an empirically measured value such as a true distance, a subscript "CALC" is used to reference a calculated value such as, for instance, a distance between two component positions.

Hereinafter, the qualifying label "intermediate" is used to refer to signals or values that are calculated using most recently obtained or calculated data while the qualifying label "current" is used to refer to signals or values that are determined as a function of both the most recently collected data and calculated values as well as other information such as known system operating characteristics, relationships between operating characteristics and specific component states, accelerations, velocities and positions, etc. In many cases intermediate values may be used as current values when other system information does not indicate that the intermediate values are inaccurate while in other cases intermediate values may be replaced by current values when other information indicates that the intermediate values are incorrect. For instance, where an elevator car has reached a boundary position (e.g., an elevator car has reached a top floor position) but an intermediate velocity value is non-zero, the intermediate velocity value may be replaced with a zero current velocity value in some embodiments as the car cannot move past the boundary position. In other cases where a non-zero intermediate velocity value occurs and is consistent with other instantaneous operating characteristics, the intermediate velocity value may be used as the current velocity value.

While systems are contemplated where diagnostic and other algorithms are performed on data (e.g., acceleration, velocity positions, etc.) as the data is generated, here, in order to simplify this explanation, it will be assumed that current data is stored in a database (see FIG. 7) for subsequent analysis.

In general, the present invention includes a system whereby a processor routinely analyzes acceleration values to determine if the values are likely attributable solely to noise, are useful (e.g., reliable) values or cannot be classified as noise or useful (i.e., are unclassified). Where the signals are noise, the processor stops integration thereof so that velocity and position values are not affected. Where the values are useful, the values are integrated to identify velocity and position values. Where the values cannot be classified, some other process is used to estimate position and velocity. In addition, operating characteristics of the car are used in certain cases to double check acceleration, velocity and position values and to modify those values if the values are inconsistent with the characteristics.

Referring now to the drawings wherein like reference numerals correspond to similar elements throughout the several views and, more specifically, referring to FIG. 1, the present invention will be described in the context of an exemplary elevator and elevator monitoring/data collection system 20 that includes, among other things, an elevator car 24 positioned within an elevator shaft 22, a processor 34 and a database 36. In the present example, shaft 22 is constructed within a building (not illustrated or labeled) to extend from a first floor identified by Position 1 to a $10^{th}$ floor identified by Position 10 where other floors between the first and $10^{th}$ floor are identified by other labels such as, for instance, Position 2, Position 7, Position 8, Position 9, etc.

Figure 2:
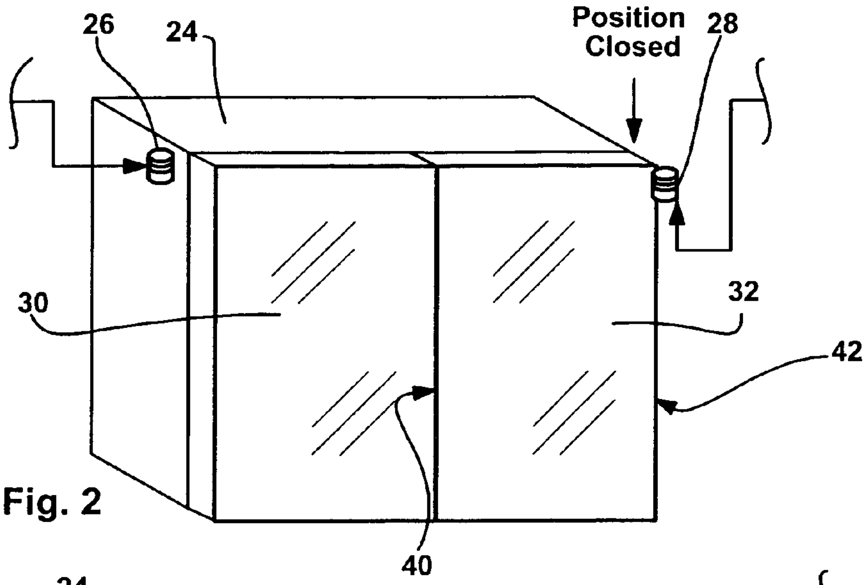
FIG. 2 is a schematic diagram illustrating an elevator car with car doors in a closed position.
Figure 3:
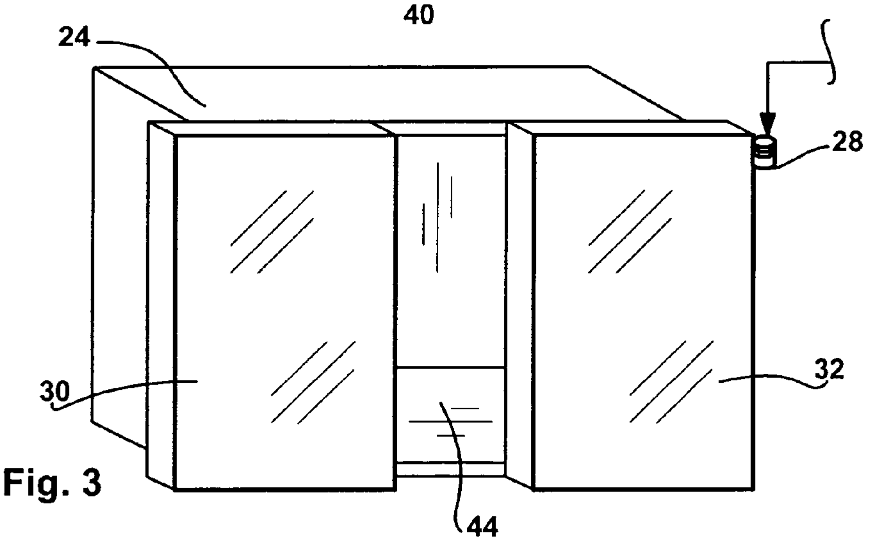
FIG. 3 is similar to FIG. 2, albeit illustrating the car doors in a partially opened position.
Figure 4:
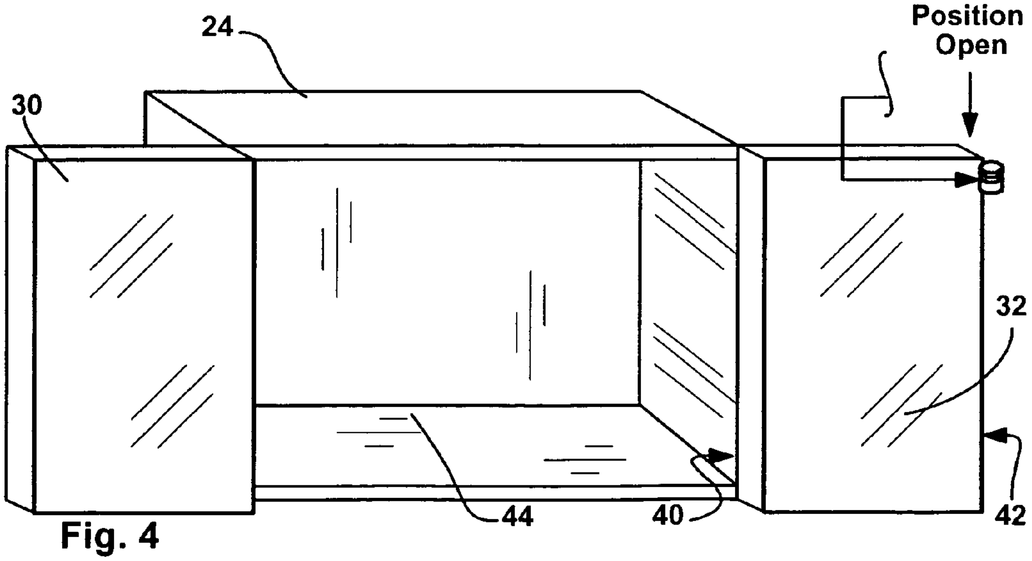
FIG. 4 is similar to FIG. 2, albeit illustrating the car doors in an open position.

Referring also to FIGS. 2, 3 and 4, sliding doors 30 and 32 are mounted along an opening side of elevator car 24 thereby enclosing an elevator space 44 when the doors are in a closed position as illustrated in FIG. 2. Doors 30 and 32 are similarly constructed and operate in a similar fashion and therefore, in the interest of simplifying this explanation, only door 32 and operation thereof will be described here in some detail. Among other characteristics, door 32 includes a leading edge 40 and a following edge 42 wherein leading edge 40 moves along the open face of car 24 when door 32 moves from the closed position in FIG. 2 to the open position in FIG. 4, or visa versa.

Figure 5:
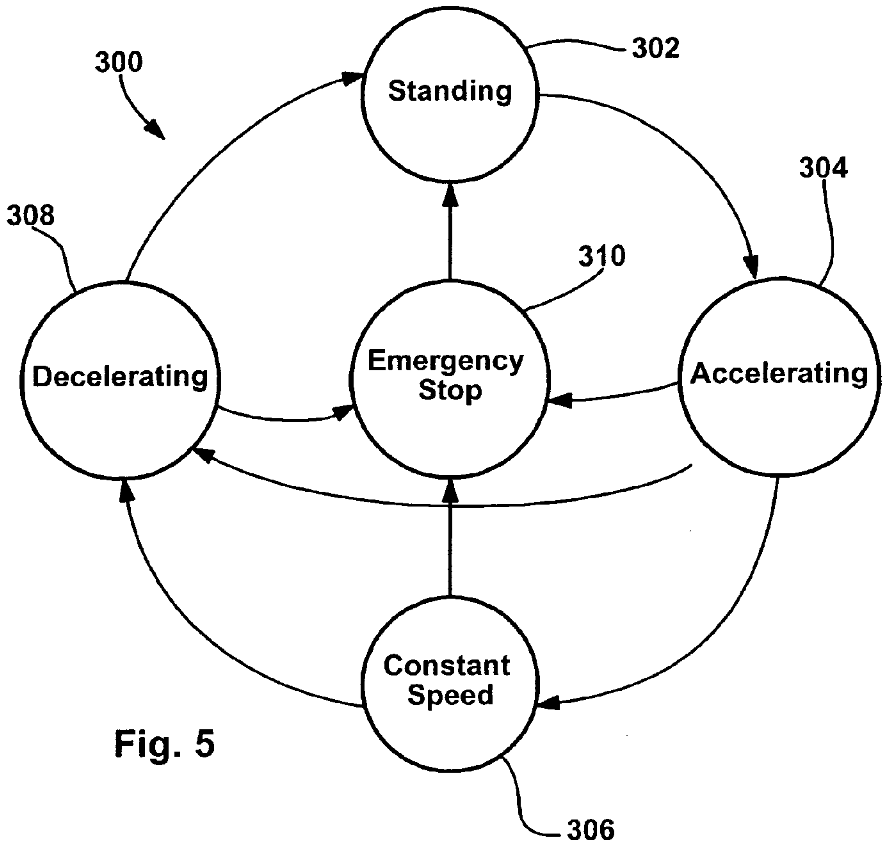
FIG. 5 is a state diagram illustrating elevator car states and possible transitions.

Referring now to FIG. 5, exemplary elevator car operating states and possible transitions between those states are illustrated as part of a state diagram 300. The operating states include a standing state 302, an accelerating state 304, a constant speed state 306, a decelerating state 308 and an emergency stop state 310. As illustrated, from standing state 302, car 24 can only transition to accelerating state 304. From accelerating state 304, car 24 can transition to any of constant speed state 306, emergency stop state 310 or decelerating state 308. From constant speed state 306, car 24 can transition to either of the emergency stop state 310 or the decelerating state 308. From decelerating state 308, car 24 can transition to either of emergency stop state 310 or standing state 302. From emergency stop state 310, car 24 can only transition to standing state 302.

Figure 18:
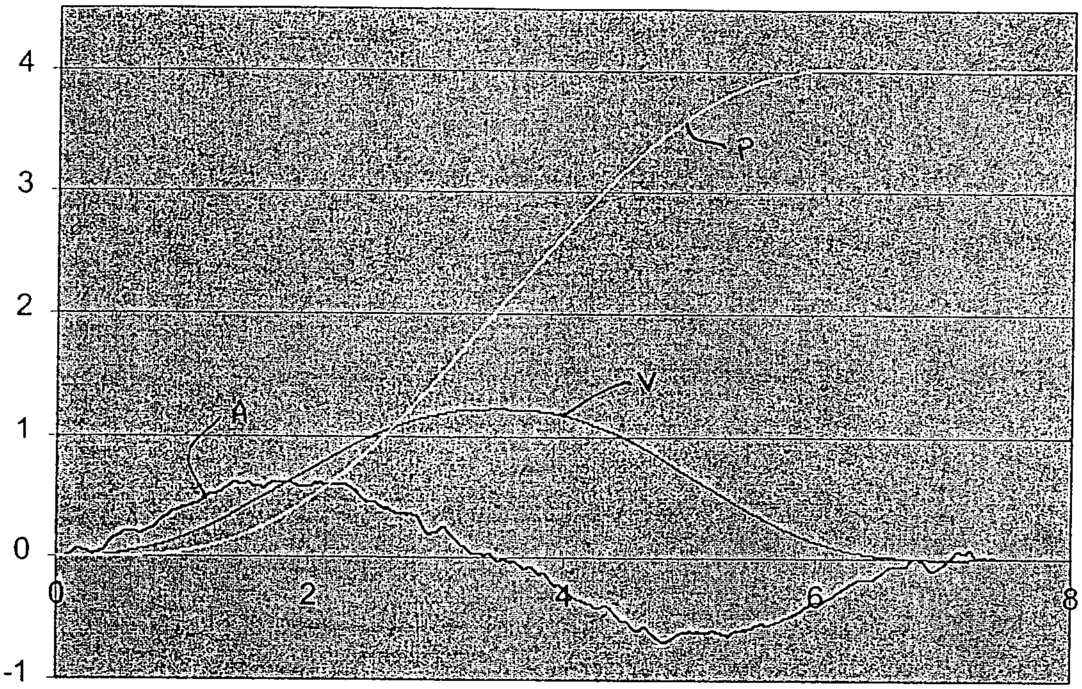
FIG. 18 is a graph including curves illustrating car acceleration, velocity and position.

Referring to FIG. 18, an exemplary real set of acceleration A, velocity V and position P curves for a car 24 during an elevator ride between two building floors (e.g., between Position 1 and Position 2 in FIG. 1) is illustrated. As seen, with car 24 initially stationary, accelerator curve A initially increases and then levels off at a constant acceleration level for a period (i.e., during the accelerating state 304 (see FIG. 5)). When the car velocity V approaches a target velocity level (i.e., the constant speed state 306), acceleration A decreases. To slow the car as the car approaches the target floor, during the decelerating state 308 in FIG. 5, acceleration curve A goes negative at an increasing rate and then levels off prior to decreasing to bring the car to a halt (i.e., back to the standing state 302 in FIG. 5) at the target floor. As seen in FIG. 18, real acceleration value A is noisy which affects the ultimate acceleration, velocity and position values.

Figure 6:
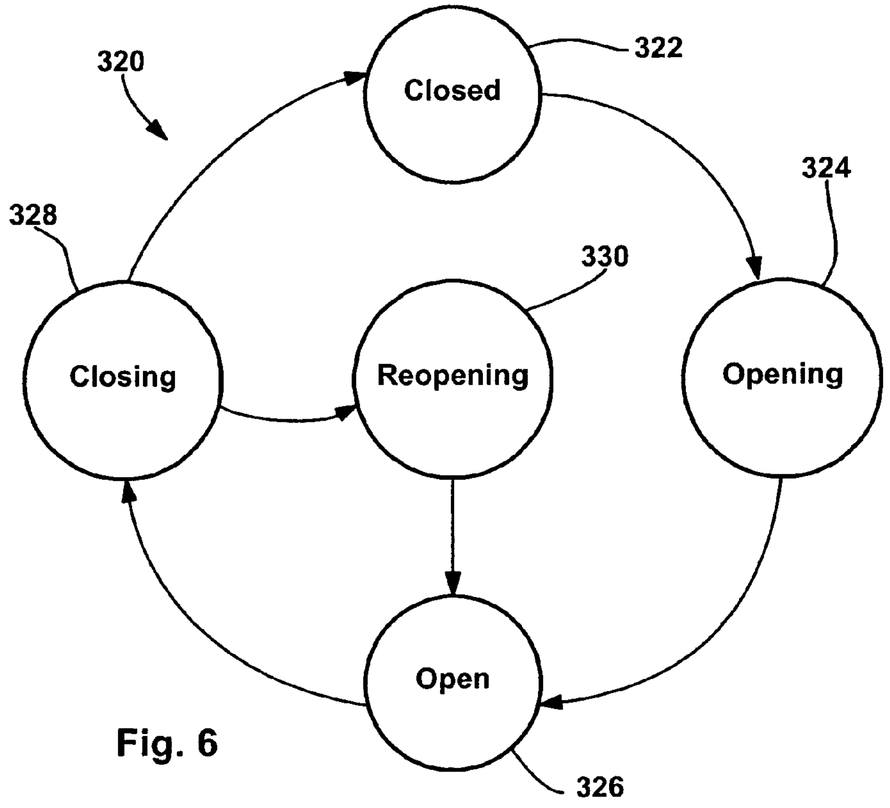
FIG. 6 is a state diagram illustrating door states and possible transitions therebetween.

Referring to FIG. 6, a state diagram 320 illustrates possible states of door 32 as well as possible transitions between those states. To this end, diagram 320 includes a closed state 322, an opening state 324, an open state 326, a closing state 328 and a reopening state 330. Referring also and again to FIG. 1, from closed state 322, door 32 can move to the opening state 324. From opening state 324, door 32 can only move to the open state 326. From open state 326, door 32 can only move to the closing state 328. As illustrated, from closing state 328, door 32 can move to either the closed state 322 or to the reopening state 330. From reopening state 330, door 32 can only move to the open state 326.

Figure 19:
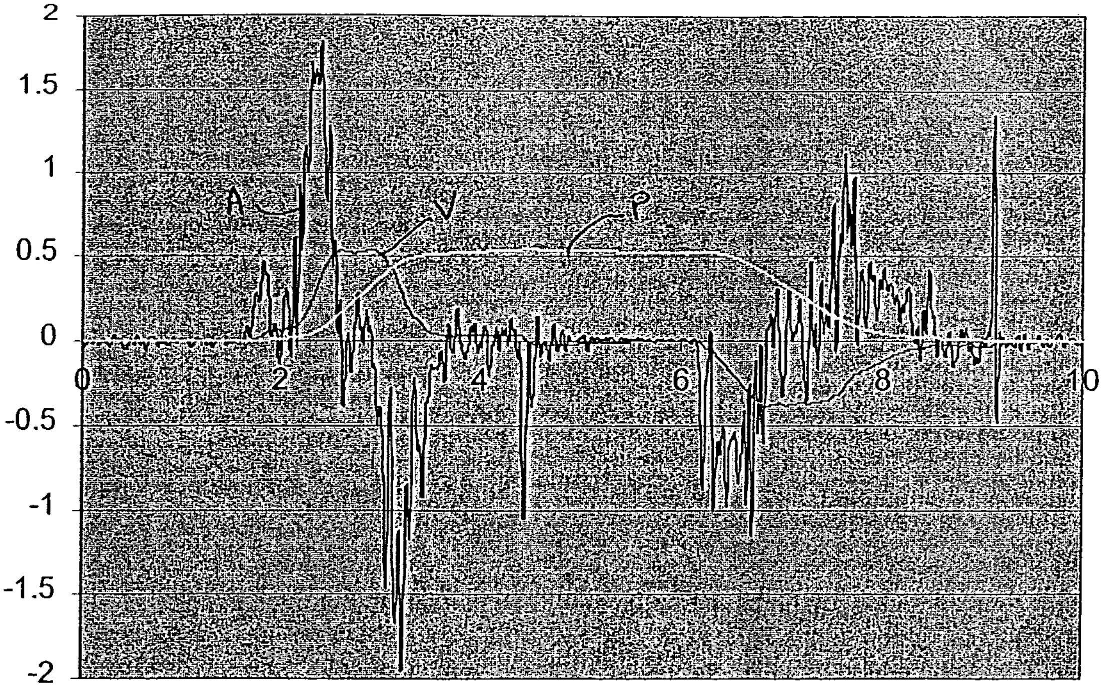
FIG. 19 is graph including curves illustrating door acceleration, velocity and position.

Referring to FIG. 19, real acceleration A, velocity V and position P curves for a car door 32 during one door cycle are illustrated. With the door 32 initially closed (see closed state 322 in FIG. 6), acceleration curve A is supposed to increase with a constant slope thereby causing the door 32 to open (i.e., see opening state 324 in FIG. 6) and velocity V to increase during opening state 324. Door acceleration A is reduced as the door nears a maximum normal operation door velocity value. When the door approaches its open position, the door is decelerated to reduce velocity V and bring door 32 to a standstill in the open position (i.e., state 326 in FIG. 6). The above door opening cycle occurs between times 1.5 and 4 in FIG. 19. To close door 32, beginning with door 32 open at time 6 in FIG. 19, the door is accelerated in the closing direction at the beginning of the closing state 328 in FIG. 6. As the door approaches its normal door closing operating velocity, the acceleration value is reduced toward zero. As the closed position (e.g., state 322) is approached, the door is decelerated until the door stops in the closed position. Real acceleration value A for door 32 is noisy and therefore affects the ultimate acceleration, velocity and position values.

In FIGS. 1–4, first and second separate accelerometers 26 and 28 are provided that are associated with elevator car 24 and door 32, respectively. Accelerometer 26 is mounted to a side wall (not labeled) of car 24 and travels therewith when car 24 moves within shaft 22. In some embodiments accelerometer 26 is mounted on top of the car or at some other convenient location. In the present example, it is assumed that accelerometer 26 is positioned at one of the marked positions (e.g., Position 1, Position 2, Position 10, etc.) when car 24 is located and stationary at an associated floor. Thus, for example, when car 24 is stationary at the first floor, accelerometer 26 is at Position 1 as indicated in FIG. 1. Similarly, when car 24 is located at the $10^{th}$ floor and is stationary, accelerometer 26 is at Position 10 as labeled. Accelerometer 28 is mounted proximate following edge 42 of door 32 and moves therewith when door 32 moves between the open and closed positions.

Referring still to FIGS. 1–4, processor 34 runs a program that includes separate modifier values $m_c$ for each of accelerometers 26 and 28 that is used to convert the associated accelerometer voltage output u to an acceleration value. During an initial commissioning procedure, it is contemplated that modifier $m_c$ is set by a maintenance engineer charged with commissioning system 20.

Figure 7:
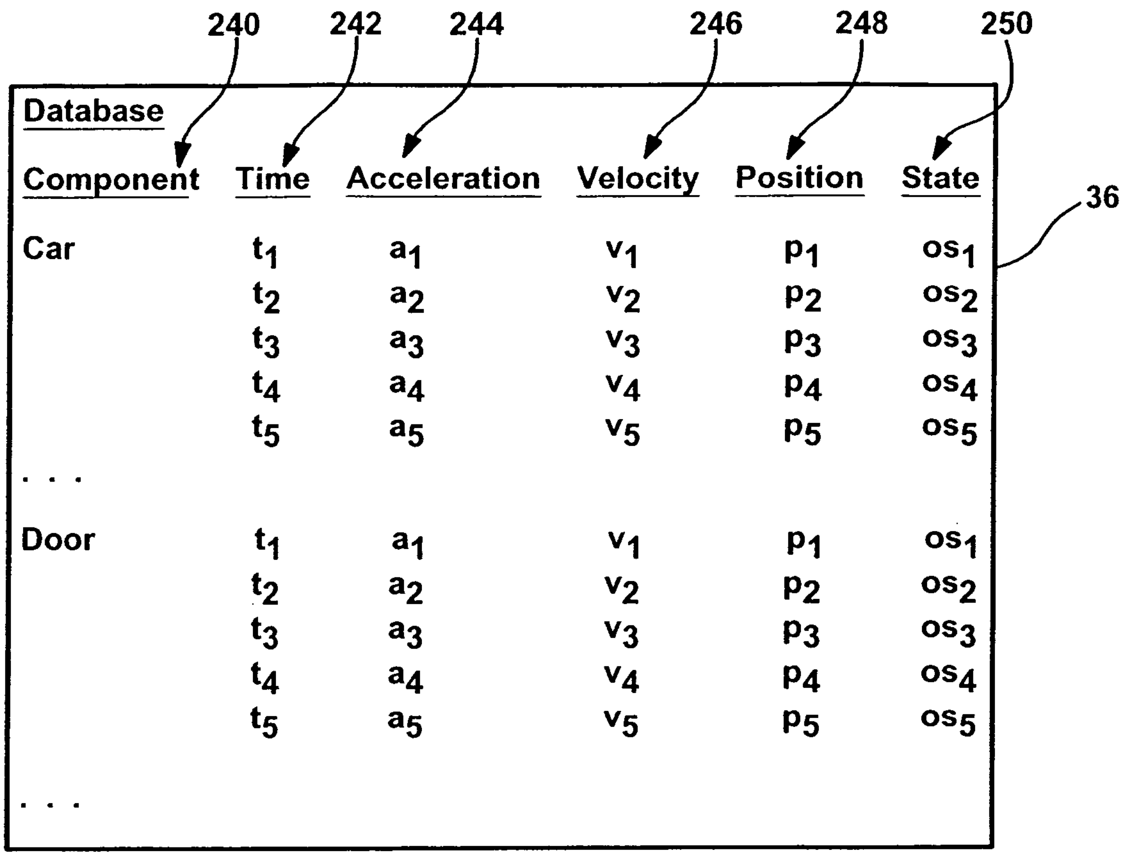
FIG. 7 is a schematic diagram illustrating an exemplary database consistent with certain aspects of the present invention.

Processor 34 is linked to each of accelerometers 26 and 28 for receiving accelerometer/acceleration values therefrom. Processor 34 is provided in addition to another control processor (not illustrated) where the control processor runs programs for controlling the elevator car and door and processor 34 simply collects acceleration values and processes those values to generate other values. Because processor 34 is for data collection processing and not for control, processor 34 and accelerometers 26 and 28 can be used with any elevator door configuration. Processor 34 uses the acceleration values to perform various functions according to different aspects of the present invention. In general, processor 34 uses the acceleration values to identify the velocities and positions of the associated components (e.g., car 24 and door 32), to determine the operating states of the components and to perform other functions described hereinafter. Processor 34 stores collected data in database 36 including, in at least some embodiments of the present invention, related components, times, acceleration values, velocity values, position values and operating states. To this end, exemplary database 36 is illustrated in FIG. 7 and includes six columns including a component column 240, a time column 242, an acceleration column 244, a velocity column 246, a position column 248 and a state column 250. Component column 240, as its label implies, lists each of the system components for which acceleration data is collect and for which other database values are determined. Consistent with the present example, component column 240 identifies car 24 and door 32.

Time column 242 identifies instances in time that are indicated by a small "t" followed by a differentiating number (e.g., 1, 2, etc.). Acceleration column 244 lists a sampled acceleration value for each one of the times in column 242. For example, acceleration value $a_1$ is a sampled value corresponding to time $t_1$, value $a_2$ is a sampled acceleration value corresponding to time $t_2$, and so on.

Velocity column 246 lists a separate velocity value for each of the times in column 242, exemplary velocity values include $v_1$ corresponding to time $t_1$, $v_2$ corresponding to time $t_2$, and so on. Position column 248 lists a component position corresponding to each of the times in column 242. For example, position $p_1$ corresponds to time $t_1$, position $p_2$ corresponds to time $t_2$, and so on. State column 250 lists a separate operating state for each of the times in column 242. For example, state $os_1$ corresponds to time $t_1$, state $os_2$ corresponds to time $t_2$, and so on.

Here, it is contemplated that, where certain of the values in one or more of the columns of database 36 do not change between instances in time, values for those specific operating characteristics would not be recorded for the corresponding times. For example, where one of the operating states for the elevator car 24 is constant speed movement, during constant speed movement, the velocity of car 24 would be unchanged and therefore, a single velocity value may be recorded in column 246 for an entire constant speed phase of operation thereby reducing the memory requirement of database 36. Similarly, where a constant speed state lasts for 15 seconds, the constant speed operating state need only be recorded once in column 250 for the entire phase of constant speed. As another example, where car 24 remains stationary at one of the building floors for a period, a single position value may be recorded in column 248 for the entire stationary period. Other ways of reducing database memory requirements are contemplated.

Hereinafter, various methods that are consistent with at least some aspects of the present invention will be described in the context system 20 described above. First, a method for identifying a bias in acceleration values generated by the accelerometers is described. In addition, this first method also determines whether or not each acceleration value generated by the accelerometers and related velocity values that are derived from the acceleration values are reliable, are likely solely attributable to noise or cannot be classified as either reliable or entirely noise attributed. Hereinafter, signals likely solely attributable to noise will be referred to as "noise signals" unless indicated otherwise.

Where signals are classified as reliable or "useful", the signals are used to derive other signals and values such as position or, in the case of acceleration values, velocity, to identify operating states or, according to at least one aspect of the present invention, to update the accelerometer gain value $m_c$. Where signals are classified as noise signals, the signals may be discarded and, where possible, acceleration, velocity and position values as well as operating states may be determined using other information. Where signals are identified as being unclassifiable, a history of recent operating characteristics may be employed to identify operating state, component position or, in at least some cases, a velocity estimate.

At this point it is helpful to understand that system noise can typically be divided into two different types of noise including hardware noise and movement related or "movement noise". Hardware noise is noise that occurs because of intrinsic limitations and nuances of the hardware, including the accelerometers, used to configure system 20. Movement noise, as the label implies, is noise that occurs because components move within the system and is usually attributable to friction between mechanical components as well as to vibrations that occur during movement. Movement noise typically has a greater magnitude than hardware noise and usually has an average value that is very close to zero. Hardware noise, on the other hand, usually results in at least a small DC offset. Thus, when hardware noise is integrated, an error associated therewith increases over time while the error associated with integration of movement noise is generally less. When a car or door moves, both hardware and movement noise occur simultaneously.

Hereinafter, while the inventive methods and subprocesses for determining and recording operating characteristics may be used to track components that comprise various system types (e.g., a sliding robot used in an automated manufacturing system, a component on an amusement park ride, etc.) and may be used to determine characteristics of each of the car and the car door of an elevator, in the interest of simplifying this explanation, unless indicated otherwise, the algorithms, methods and subprocesses of the present invention will be described in the context of car 24 and movements thereby. Nevertheless it should be appreciated that, in at least some embodiments, the algorithms and methods would be performed simultaneously for both car doors as well as for the car itself. For instance, in at least some applications car state and final acceleration, velocity and position may at least in part be determined by identifying door state and door state and final acceleration, velocity and position may at least in part be determined by identifying car state. These concepts are described in greater detail below.

Figure 8:
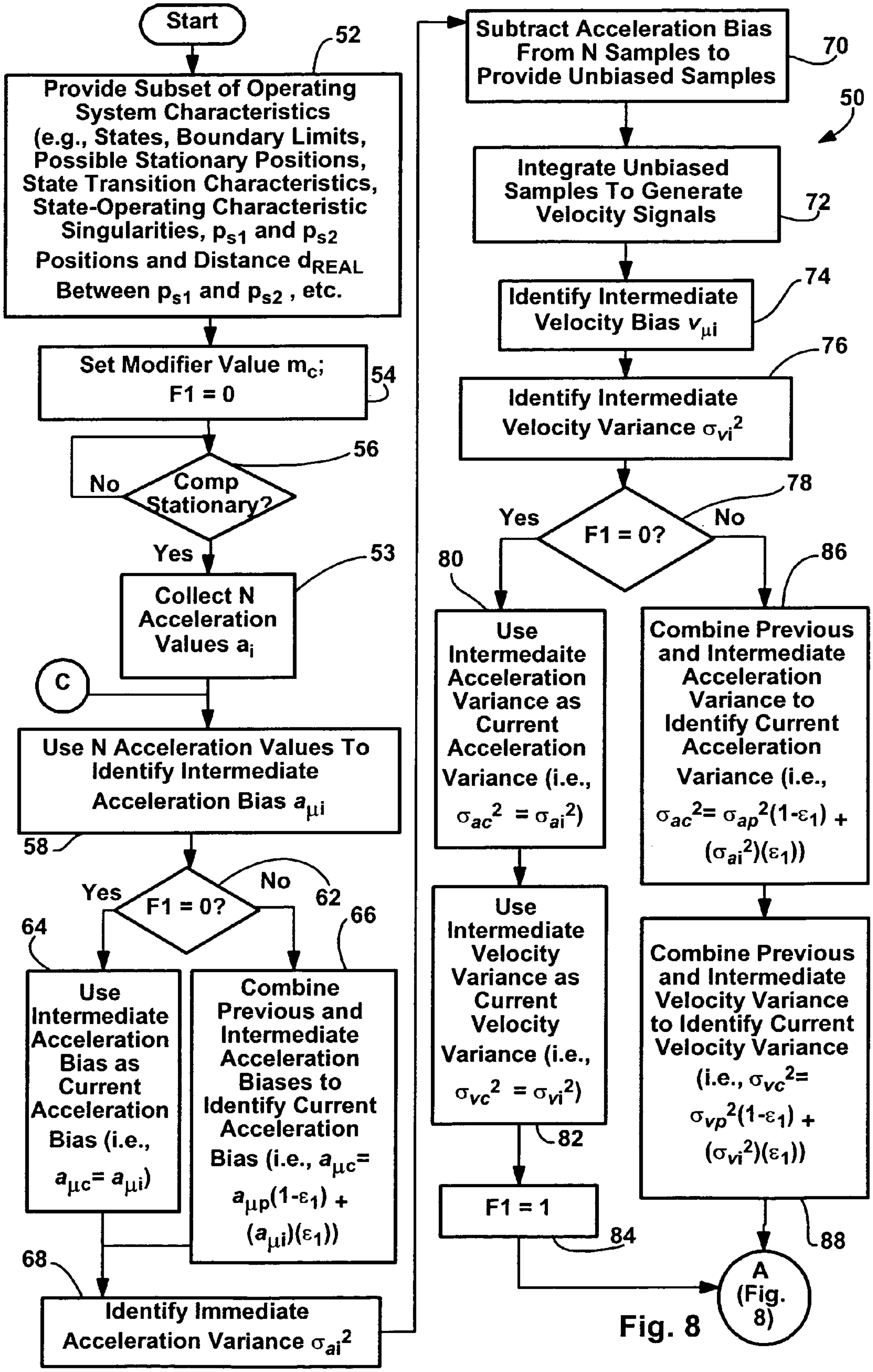
FIG. 8 is a flow chart illustrating a portion of at least one method according to at least some embodiments of the present invention.
Figure 9:
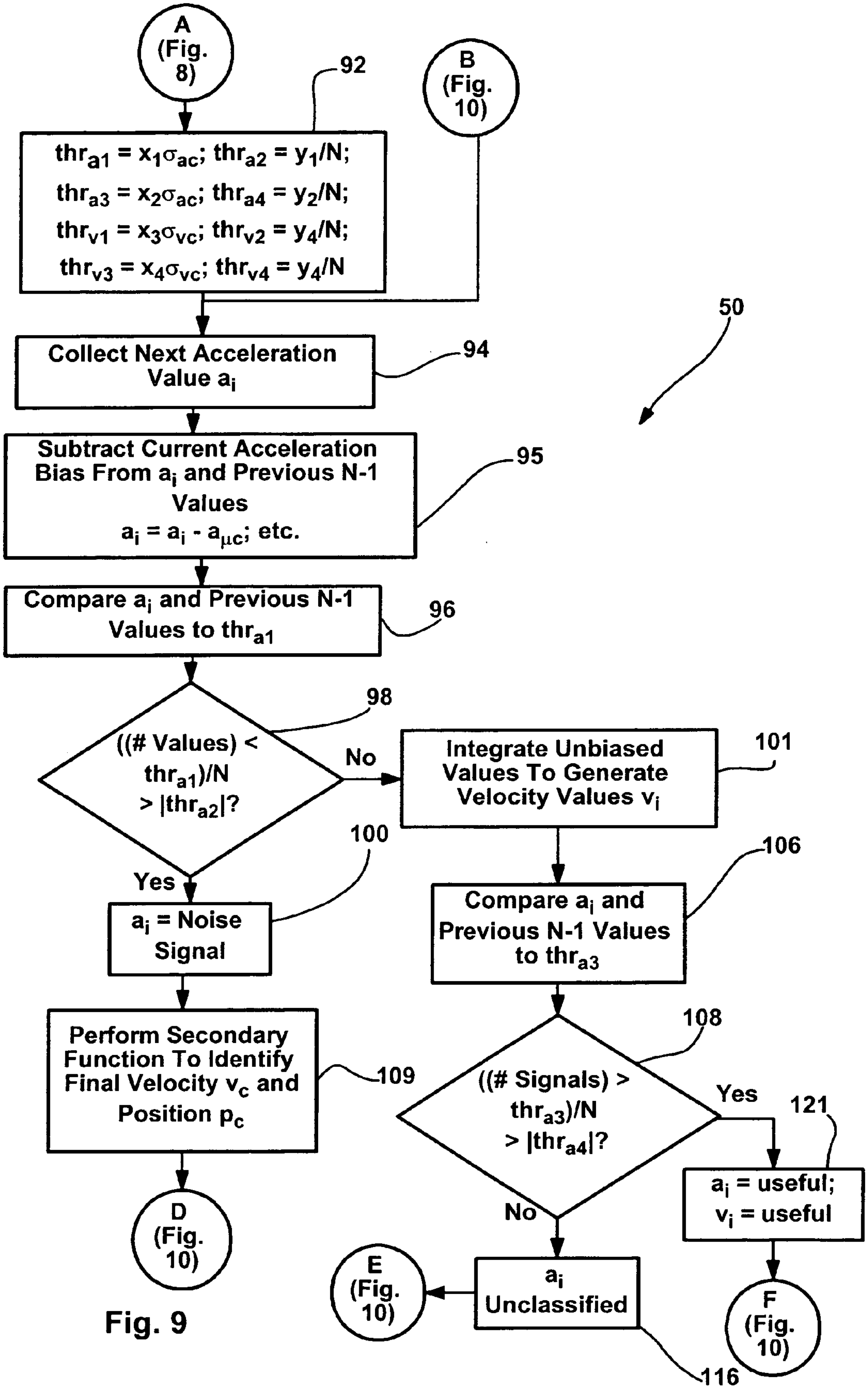
FIG. 9 is a flow chart illustrating a second portion of the method of FIG. 8.
Figure 10:
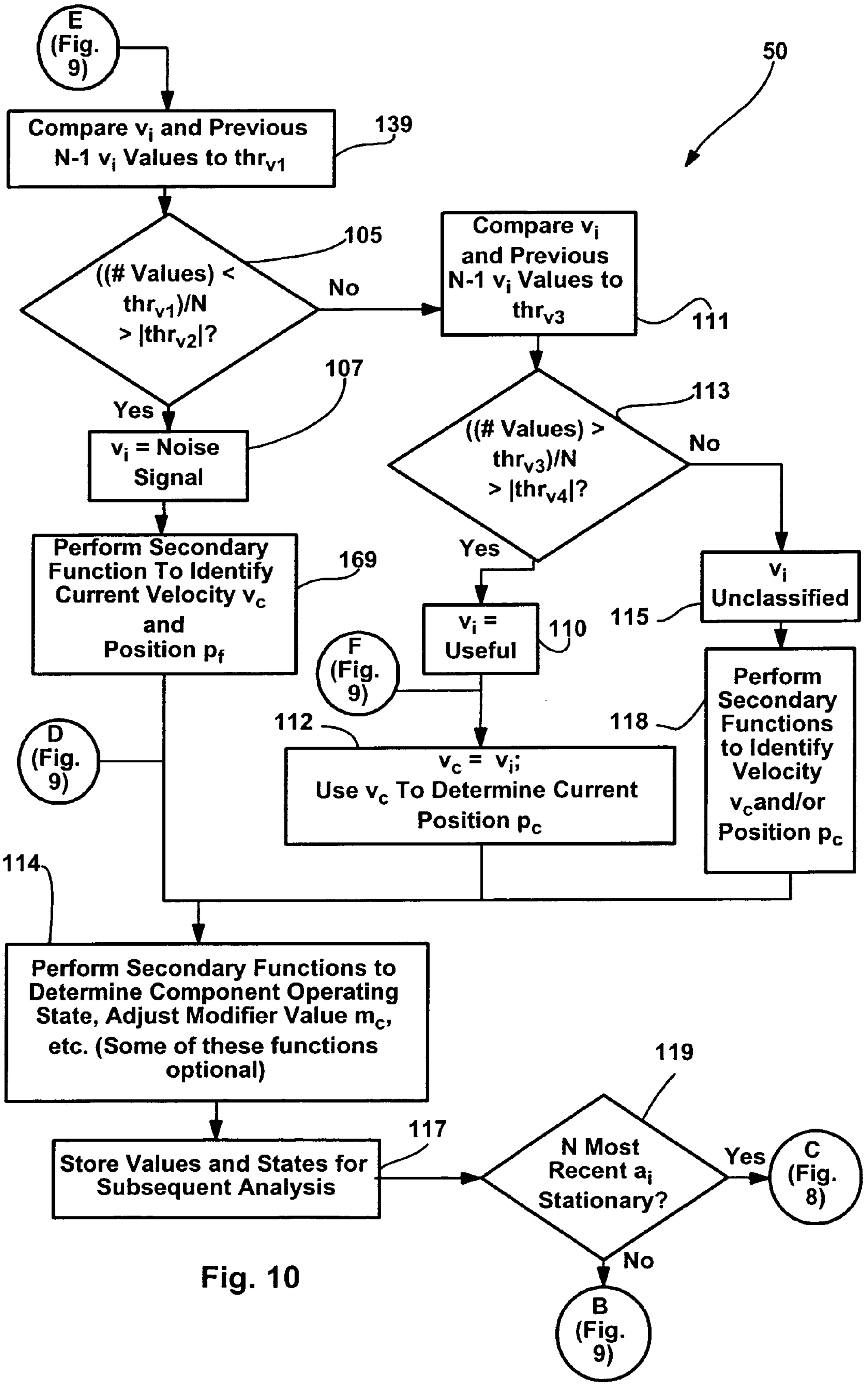
FIG. 10 is a flow chart illustrating a third portion of the flow chart of FIGS. 8 and 9.

Referring now to FIGS. 8 through 10, an exemplary method 50 according to at least some aspects of the present invention is illustrated. Referring also to FIG. 1, at block 52, a subset of operating characteristics corresponding to system 20 is provided to processor 34 by a commissioning engineer (i.e., a programmer) or the like. To this end, in at least some embodiments, component operating states like the states illustrated in FIGS. 6 and 7 are specified in a program run by processor 34 as well as state transition characteristics that define possible state-to-state transitions. For example, referring again to FIG. 6, the transition characteristics may specify that elevator car 24 can transition from standing state 302 to accelerating state 304 or from accelerating state 304 to any of emergency stop state 310, decelerating state 308 or constant speed state 306.

In addition, in at least some cases, the state transition characteristics may also specify a subset of operating characteristics that indicate a transition from one state to another. To this end, referring still to FIG. 6, when car 24 moves from standing state 302 to accelerating state 304, the magnitude of the acceleration values will increase appreciably and hence, a transition characteristic corresponding to a state transition from standing state 302 to accelerating state 304 may require that the magnitude of the acceleration values increases above some threshold level. For instance, where the magnitude of acceleration rises to greater than 90% of a maximum acceleration value, it may be assumed that car 24 is moving. In this example, the condition for determining whether or not car 24 is moving is reliable despite being simple because it is nearly impossible that a value of 90% of the maximum acceleration value could be solely attributable to of noise. Other, more complex transition characteristic sets are contemplated. For instance, for a transition from standing to accelerating, a set of transition conditions may require that the most recent state be standing, that each of an acceleration value and a velocity value be reliable (e.g., useful), and either that car acceleration be less than a negative first acceleration threshold value $-thr_{a1}$ (described below), car velocity be less than a negative first velocity threshold $-thr_{v1}$ and car jerk be negative or that car acceleration be greater than a positive first acceleration threshold value $thr_{a1}$ (described below), car velocity be greater than a positive first velocity threshold $thr_{v1}$ and car jerk be positive. Many other transition characteristic sets are contemplated.

Referring still to FIG. 8, other operating characteristics that may be provided at block 52 include component-to-component state operating characteristic singularities. To this end, there are component states that have to occur when specific sets of operating characteristics occur. For example, for safety purposes, most elevators are programmed such that elevator doors 30 and 32 will not open while an associated car 24 is moving and, similarly, so that the car 24 will not move when the elevator doors associated therewith are open. Thus, when car 24 is moving, it can be assumed that door 32 is in the closed state 322 (see again FIG. 7) and is in the closed position (see FIG. 2). Moreover, when car 24 is moving, it can be assumed that the door velocity is zero and that the door is in the closed state. Similarly, when door 32 is in any of the opening state 324, open state 326, closing state 328 or reopening state 330, it can be assumed that car 24 is in the standing state 302 (see again FIG. 6), has a zero velocity value and has a zero acceleration value. The singularities that may be provided as part of the operating characteristics would specify these one-to-one relationships between operating characteristics and states as well as between states of different system components or at least a sub-set of these relationships.

In addition, the operating characteristics provided at block 52 may include boundary limits such as positions of components at the ends of their respective strokes, possible stationary positions and distances between stationary positions. Here, stationary positions, as the label implies, includes positions in which a component is known to remain stationary for a predetermined amount of time. For example, in the case of elevator car 24, car 24 remains stationary each time it stops at one of the Positions 1 through 10 corresponding to the building floors and hence, in the present example, ten stationary positions may be specified as part of the operating system characteristics for car 24. In the case of door 32, the stationary positions will typically include a closed position as illustrated in FIG. 2 and an open position as illustrated in FIG. 4. With respect to distances between stationary positions, an exemplary distance $D_{REAL}$ between Position 1 and Position 10 corresponding to the first and $10^{th}$ floors is illustrated in FIG. 1. In some cases additional or other distances are contemplated and may be specified at block 52.

Figure 20:
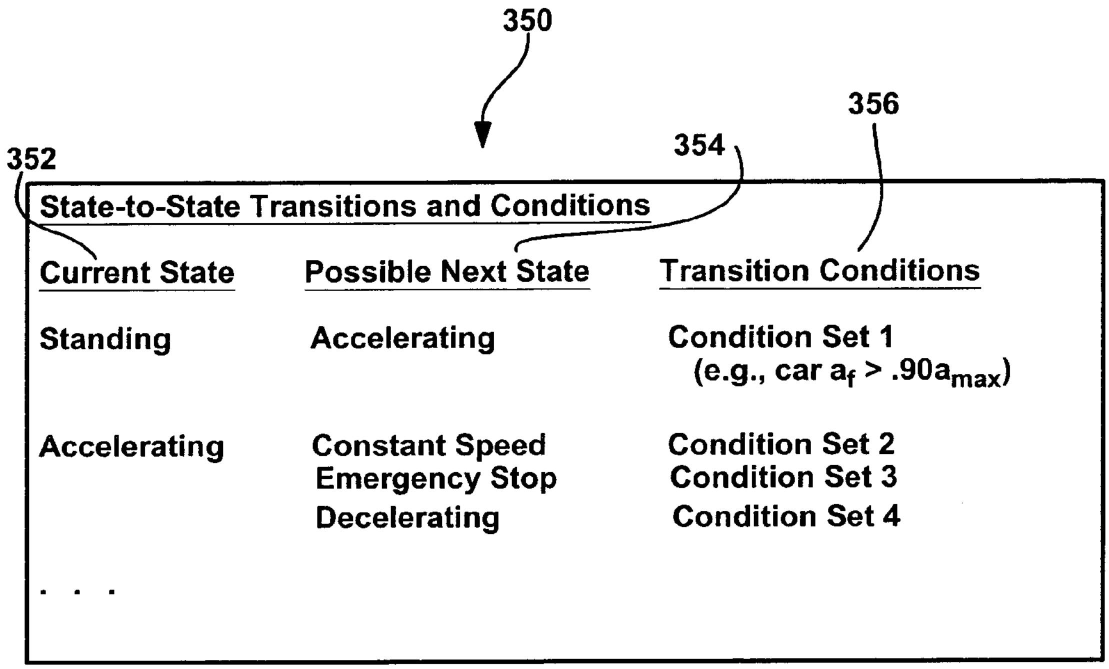
FIG. 20 is a schematic diagram illustrating a table that lists exemplary state-to-state transitions and associated conditions that may be specified for an elevator car.
Figure 21:
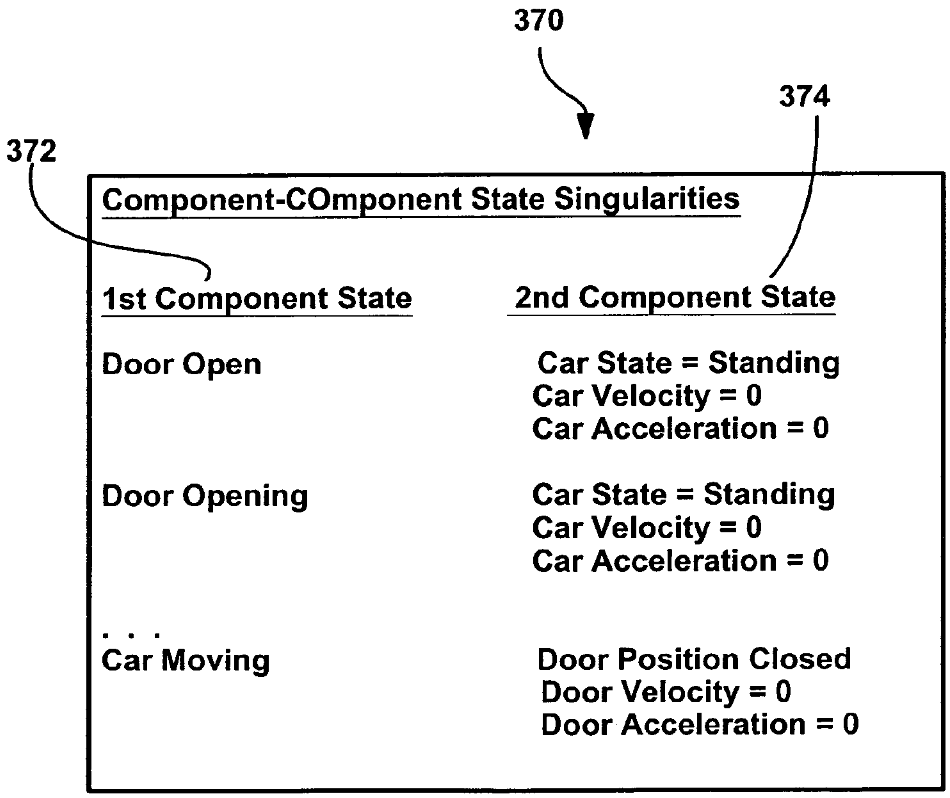
FIG. 21 is a schematic diagram illustrating a table that lists exemplary component-to-component state singularities that may be specified via a processor or the like for a car/door configuration.

While the component-to-component possibilities, characteristic-to-state singularities, boundaries, distances and other operating characteristics would likely be implemented in software, two exemplary tables that illustrate at least some programmed characteristics are illustrated in FIGS. 20 and 21 in order to simplify this explanation.

Referring to FIG. 20, an exemplary state-to-state transitions and conditions table 350 is illustrated that includes a current state column 352, a possible next state column 354 and a transition conditions column 356. Current state column 352 lists each of the possible car 24 states (only two shown) that are indicated in FIG. 5. Possible Next Column 354 lists, for each state in column 352, each of the next possible states. Thus, for the standing state in column 352, consistent with FIG. 5, only the accelerating state is listed in column 354 while several states are listed in column 354 for the accelerating state in column 352. Transition column 356 lists one or more transition conditions for each possible next state in column 354 that indicate a transition from the state in column 352. For instance, where acceleration is 90% of a maximum normal operating acceleration value $a_{max}$ and the most recent known state is standing, the current state, as indicated by condition set 1 in column 356, is accelerating. Other condition sets are identified in column 356.

Referring to FIG. 21, an exemplary component-to-component state singularities table 370 includes a first component state column 372 and a second component state column 374. First column 372 lists at least a subset of the states of at least some system 20 components. Exemplary listed states include the door open state, the door opening state, and the car accelerating state. Second column 374 lists, for each state in column 372, a state and other operating characteristics (e.g., velocity, acceleration) of a component other than the component associated with the state in column 372 that must occur when the state in the column 372 occurs. For example, when door 32 is open, car 23 must be standing still and the car velocity and acceleration must be zero. Thus, three separate singularities exist between the door open state and each of the car standing value, the car velocity value and the car acceleration state. Other exemplary singularities are shown in Table 370.

Referring once again to FIG. 8, after the operating system characteristics have been provided at block 52, control passes to block 54. At block 54, an initial software based modifier value $m_c$ is specified and provided to processor 34. In addition, at block 54, a flag F1 is set equal to zero. Flag F1 is used to distinguish an initial acceleration bias, acceleration variance and velocity variance determination from subsequent determinations during the system operating process so that the initial and subsequent values can be determined in different ways.

Referring to FIGS. 1 and 8, at block 56, processor 34 determines whether or not car 24 is stationary. Here, where car 24 is stationary, ideally, the acceleration values should have a zero value (i.e., when the car is stationary the car cannot be accelerating or decelerating). Where the car is stationary and accelerometer 26 generates non-zero values, the non-zero values are associated with noise and can be used to identify a bias (e.g., a DC type offset), a variance and a standard deviation which can in turn be used during subsequent car operation to distinguish reliable signals from other signals. Thus, the inventive methods generally occur after at least a first stationary period commences. The initial determination regarding whether or not the car is stationary is manually aided whereby a commissioning engineer indicates to processor 34 that car 24 is stationary.

In the present case, the algorithms employed require that the car be stationary for at least a period long enough for accelerometer 26 to generate N acceleration values. In most cases N will include a plurality of values. The condition at block 56 is only met if car 24 is stationary for at least the period required to generate N acceleration values. Where car 24 is not stationary, control continues to loop through block 56.

Referring still to FIG. 8, once car 24 is stationary at block 56, control passes to block 53 where N acceleration values are collected. At block 58 processor 34 uses the N most recent acceleration values from accelerometer 26 to identify an intermediate acceleration bias $a_{\mu i}$ by solving the following equation:

$$a_{\mu i} = \frac{1}{N}\sum_{i=0}^{N-1} a_i \qquad \text{Eq. 1}$$

At block 62, processor 34 determines whether or not flag F1 is still zero. The first time through decision block 62, flag F1 will be zero indicating that the stationary period is the first stationary period and that the initial acceleration bias, initial acceleration variance and initial velocity variance are to be determined during the current pass through the steps of method 50 that follow block 62 in FIG. 8. Where flag F1 is zero, control passes to block 64. At block 64, processor 34 uses the intermediate acceleration bias $a_{\mu i}$ as the current acceleration bias $a_{\mu c}$ and control passes to block 68. At block 68, processor 34 identifies an intermediate acceleration variance $\sigma_{ai}^2$ by solving the following equation:

$$\sigma_{ai}^2 = \frac{1}{N-1}\sum_{i=0}^{N-1} (a_i - a_{\mu i}) \qquad \text{Eq. 2}$$

Continuing, at block 70, processor 34 subtracts the final acceleration bias $a_{\mu f}$ from each of the N samples to provide an unbiased sample set. At block 72, processor 34 integrates the un-biased samples to generate velocity values $v_0$ through $v_{n-1}$. At block 74, processor 34 identifies an intermediate velocity bias $v_{\mu i}$ by solving the following equation:

$$v_{\mu i} = \frac{1}{N}\sum_{i=0}^{N-1} v_i \qquad \text{Eq. 3}$$

At block 76, processor 34 identifies an intermediate velocity variance $\sigma_{vi}^2$ by solving the following equation:

$$\sigma_{vi}^2 = \frac{1}{N-1}\sum_{i=0}^{N-1}(v_i - v_{\mu i}) \qquad \text{Eq. 4}$$

Referring still to FIGS. 1 and 8, at block 78, processor 34 determines whether or not flag F1 is zero. Where flat F1 is still zero (i.e., during the first pass through block 78), control passes to block 80 where processor 34 uses the intermediate acceleration variance as the current acceleration $\sigma_{ac}^2$ variance and at block 82, processor 34 uses the intermediate velocity variance as the current velocity variance $\sigma_{vc}^2$. After block 82, at block 84, flag F1 is set equal to one which indicates that the initial acceleration bias and initial variances have been identified. After block 84, control passes back to block 92 in FIG. 9.

Referring still to FIG. 8, and, again to decision block 62, if flag F1 is not equal to zero (i.e., during the second or subsequent passes through block 62 and block 84), control passes to block 66. At block 66, processor 34 combines a previous acceleration bias $a_{\mu p}$ and the intermediate acceleration bias $a_{\mu i}$ to identify a current acceleration bias $a_{\mu c}$ by solving the following equation:

$$a_{\mu c} = a_{\mu p}\cdot(1-\epsilon) + a_{\mu i}(\epsilon_1) \qquad \text{Eq. 5}$$

where $\epsilon_1$ is a convergence constant that ranges from 0 to 1.

Referring again to block 78, where flag F1 is one (i.e., is not zero), control passes to block 86 where processor 34 combines a previous acceleration variance $\sigma_{ap}^2$ and the intermediate acceleration variance $\sigma_{ai}^2$ to identify a current acceleration variance $\sigma_{ac}^2$ by solving the following equation:

$$\sigma_{ac}^2 = \sigma_{ap}^2(1-\epsilon_2) + \sigma_{ai}^2(\epsilon_2) \qquad \text{Eq. 6}$$

where $\epsilon_2$ is a convergence constant that ranges from 0 to 1. In addition, at block 88, processor 34 combines a previous velocity variance $\sigma_{vp}^2$ and the intermediate velocity variance $\sigma_{vi}^2$ to identify a current velocity variance $\sigma_{vc}^2$ by solving the following equation:

$$\sigma_{vc}^2 = \sigma_{vp}^2\cdot(1-\epsilon_3) + \sigma_{vi}^2\cdot\epsilon_3 \qquad \text{Eq. 7}$$

where $\epsilon_3$ is a convergence constant that ranges from 0 to 1. After block 88, control passes to block 92 in FIG. 9.

Thus, during second and subsequent stationary periods, the acceleration bias $a_{\mu c}$, acceleration variance $a_{ac}^2$ and velocity variance $\sigma_{vc}^2$ are modified as a function of most recently acquired acceleration values as well as a function of previous similar values such that the bias and variance values are updated routinely over time.

Referring to FIGS. 1 and 9, at block 92, processor 34 identifies first and third acceleration threshold values $thr_{a1}$ and $thr_{a3}$, respectively, by multiplying scalars $x_1$ and $x_2$ by an acceleration standard deviation $\sigma_{ac}$ which is the square root of the current acceleration variance as identified at either of block 80 or 86 described above. In addition, at block 92, processor 34 identifies first and third velocity threshold values $thr_{v1}$ and $thr_{v3}$, respectively, by multiplying scalars $x_3$ and $x_4$ by a velocity standard deviation $\sigma_{af}$ which is the square root of the velocity variance as identified at either block 82 or block 88. Here, factor $x_2$ is greater than factor $x_1$ and factor $x_4$ is greater than factor $x_3$. Factors $x_1$ and $x_2$ are selected by a commissioning engineer and reflect a confidence level that is related to the expected level of input noise in the acceleration values. For example, where hardware noise level is expected to be relatively high, each of values $x_1$ and $x_2$ will typically be set relatively high. Values $x_1$ and $x_2$ may be set at step 52 as part of the operating system characteristics. Similarly, factors $x_3$ and $x_4$ are selected by a commissioning engineer and reflect a confidence level related to the expected level of input noise. Moreover, at block 92, processor 34 identifies second and fourth acceleration threshold values $thr_{a2}$ and $thr_{a4}$ and second and fourth velocity threshold values $thr_{v2}$ and $thr_{v4}$ which, as illustrated, may be represented by ratios $y_1$, $y_2$, $y_3$ and $y_4$ divided by N where N is a number of samples in an exemplary sequence of acceleration values. Here $y_1$, $y_2$, $y_3$ and $y_4$ are smaller than N and may be set at step 52.

At block 94, processor 34 obtains a next acceleration value $a_i$ from accelerometer 26. At block 95, processor 34 subtracts the most recent final acceleration bias $a_{\mu f}$ from the next value $a_i$ and from each of the previous N−1 values to generate an unbiased sample sequence. At block 96, processor 34 compares each of the unbiased values in the sequence to first acceleration threshold $thr_{a1}$. At block 98, processor 34 determines whether or not the number of values in the sequence less than threshold $thr_{a1}$ divided by N is greater than second acceleration threshold value $thr_{a2}$. Where the number of values less than threshold $thr_{a1}$ divided N is greater than threshold value $thr_{a2}$, control passes to block 100. In the alternative, control passes to block 101.

At block 100, processor 34 identifies value $a_i$ as a noise value. Referring still to FIG. 9, at block 109, processor 34 performs some secondary function to determine current velocity $v_c$ and current position $p_c$ of car 24. After block 109 control passes to block 114 in FIG. 10.

Referring still to FIGS. 1 and 9, at block 101, processor 34 integrates the unbiased values $a_i$ or the N (here N may be different than value N above) most recent unbiased values including value $a_i$ to generate an intermediate velocity value $v_i$. At block 103, processor 34 compares each of value $v_i$ and the previous N−1 velocity values to first velocity threshold value $thr_{v1}$. Referring to FIG. 10, at block 105, when the number of compared values less than value $thr_{v1}$ divided by N is greater than second velocity threshold value $thr_{v2}$, control passes to block 107 where velocity value $v_i$ is identified as a noise signal.

At block 106, processor 34 compares value $a_i$ and each of the previous N−1 unbiased acceleration values to third acceleration threshold value $thr_{a3}$. At block 108, where the number of compared values greater than third threshold value $thr_3$ divided by N is greater than fourth acceleration threshold value $thr_4$, control passes to block 121 where value $a_i$ as well as velocity value $v_i$ are recognized as useful. Here, when acceleration value $a_i$ is useful, associated velocity value $v_i$ is also useful. After block 121 control passes to block 112 in FIG. 10. In the alternative, control passes to block 116. At block 112, processor 34 uses useful values including values $v_i$ to identify a current velocity $v_c$ of car 24 as well as a current position $p_c$. In at least some embodiments the velocity values including value $v_c$ are integrated to identify position $p_c$. After block 112, control passes to block 114.

When control passes to block 116, processor 34 determines that the sample value $a_i$ cannot be classified as either useful or likely solely attributable to noise. After block 116 control passes to block 139 in FIG. 10 where processor 34 compares velocity value $v_i$ and the previous N−1 velocity values to first velocity threshold value $thr_{v1}$. At block 105, where the number of compared values (i.e., $v_i$ and the N−1 previous velocity values) that are less than value $thr_{v1}$ over N is less than second velocity value $thr_{v2}$, control passes to block 111 where value $v_i$ and each of the N−1 previous velocity values are compared to third velocity threshold value $thr_{v3}$. At block 113, where the number of compared values greater than value $thr_{v3}$ over N is greater than value $thr_{v4}$, control passes to block 110 where velocity value $v_i$ is identified as useful. After block 110 control passes to block 112 where the process continues as described above. In the alternative, control passes to block 115 where velocity value $v_i$ is identified as unclassified. Continuing, at block 118, processor 34 performs a secondary function to identify current car velocity $v_c$ and position $p_c$. After block 118, control passes to block 114.

At block 114, any of several different secondary functions are performed to determine an operating state, to update modifier $m_c$ or to perform other optional functions. After block 114, control passes to block 117 where reliable/useful final acceleration, velocity and position values as well as states and update modifier $m_c$ are stored for subsequent use/analysis. At block 119, processor 34 determines if car 24 has been stationary for the past N detected acceleration values. Where car 24 has been stationary for the past N detected acceleration values, control passes back up to block 58 in FIG. 8 where the process described above is repeated to update the acceleration bias $a_{\mu c}$, variance $\sigma_{ac}^2$, variance $\sigma_{vc}^2$ and thresholds $thr_{a1}$, $thr_{a3}$, $thr_{v1}$ and $thr_{v3}$. Where car 24 has not been stationary for the most recent N detected acceleration values, at block 119, control passes back up to block 94 in FIG. 9 where processor 34 obtains the next acceleration value $a_i$ and the process above is repeated.

Figure 11:
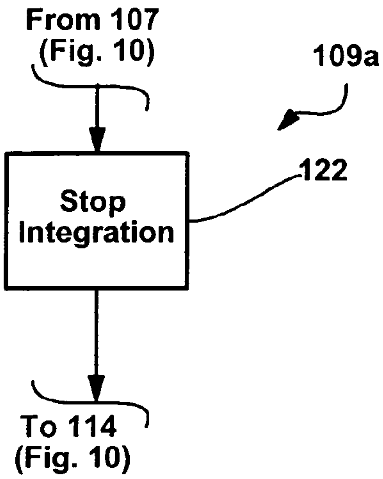
FIG. 11 is a subprocess that may be substituted for a portion of the process of FIG. 10.

Referring now to FIG. 11, one subprocess 109*a* that may be substituted for block 109 in FIG. 9 is illustrated. Referring also to FIG. 9, if the intermediate velocity value $a_i$ is pure noise, control passes to block 122 in FIG. 11. At block 122, processor 34 stops integration of the acceleration and velocity values. In this regard, stopping integration may include, for the current accelerometer cycle, storing the previous useful velocity and position values in database 36. After block 122, control passes back to block 114 in FIG. 10 where secondary functions may be performed to determine component operating state, to adjust software based gain $m_c$, etc.

Scalar values $x_1$, $x_2$, etc., are selected such that the resulting threshold values $thr_{a1}$, $thr_{a2}$, etc., in general, will eliminate hardware related noise but will not eliminate movement related noise. Thus, for example, in FIG. 19, the threshold scalar values $x_1$, $x_2$, etc., should be selected so that hardware noise that occurs before time 1.5 is not integrated but so that higher magnitude movement related signal or noise that occurs, for instance, between times of approximately 3.75 and 4.25, is integrated. In this way, despite the fact that the acceleration value is near zero at approximately time 2.25, integration will continue so that door position continues to change until the door reaches the next stationary position.

Thus, when the condition of block 98 occurs (see FIG. 9) acceleration value $a_i$ is too noisy to be reliable and integration of the acceleration value to update velocity and of the velocity value to update position is halted. Where value $a_i$ is not a noise value at block 98, at block 108, processor 34 determines if acceleration value $a_i$ is useful or unclassifiable. Where acceleration value $a_i$ is useful, at block 112 the current velocity $v_c$ is set equal to the velocity value associated with value $a_i$ and is used to identify the current position $p_c$. Where acceleration value $a_i$ cannot be classified as a noise value at block 98 or as a useful value at block 108, the velocity value $v_i$ is examined at blocks 105 and 113 to determine if velocity value $v_i$ is a noise signal or is a useful signal.

While method 50 is described above as one where velocity values are checked for reliability even after acceleration values are deemed to be unclassifiable, it should be appreciated that simpler methods are contemplated that are nevertheless still consistent with at least some inventive aspects. For instance, in some cases, if an acceleration value is unclassifiable, it may be assumed that a velocity value associated therewith is not useful even though the velocity values may be useful in some cases. Here, while the data collecting results are less thorough, processing requirements may be reduced as the sections of flow diagram 50 related to velocity thresholding (e.g., blocks 82, 88, 105, 107, 111 and 113) could be eliminated. Moreover, in cases where acceleration values are not to be recorded or used for other purposes, the acceleration thresholding subprocesses may be eliminated and instead velocity values may be used for thresholding purposes. Here, however, it should be recognized that velocity values are calculated from acceleration values and therefore do not reflect system operating conditions as quickly as acceleration values and therefore, while a system that relies solely on velocity thresholding is possible, acceleration thresholding is particularly advantageous.

Figure 12:
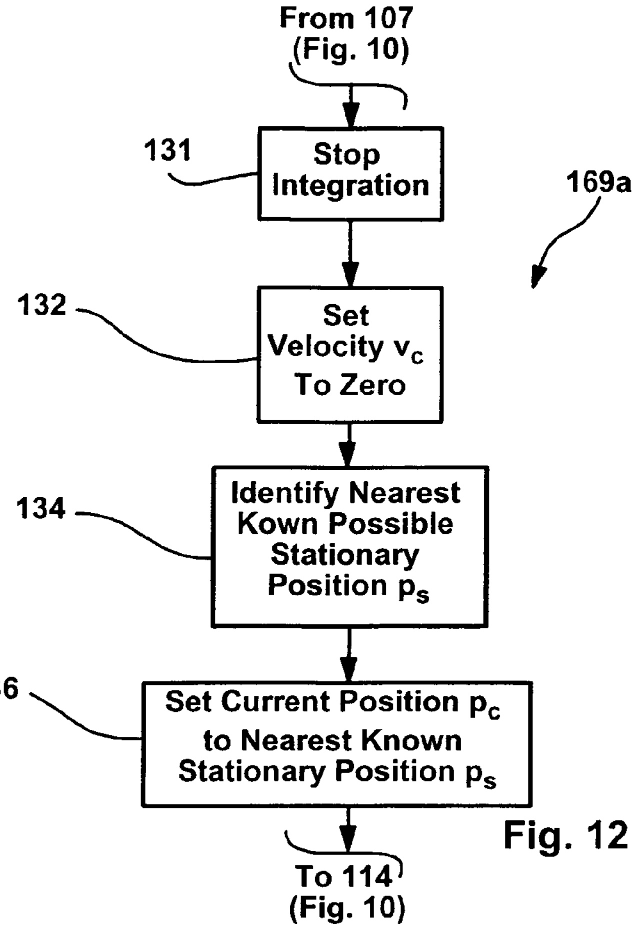
FIG. 12 is a subprocess that may be substituted for a portion of the process of FIG. 10.

Referring to FIG. 12, a subprocess 169*b* that may be substituted for process block 169 in FIG. 10 is illustrated. Referring also to FIG. 10, when the intermediate velocity value $v_i$ is recognized as a noise signal, control may pass to block 131 in FIG. 12 where processor 34 stops integration. Continuing, at block 132, processor 34 may set the current velocity associated with the current accelerometer cycle to a zero value if it is assumed that the car 24 is not moving when the velocity value is a noise signal. At block 134, processor 34 may be programmed to identify the stationary position $p_s$ that car 24 stops at during normal operation that is nearest to the car position when the velocity is set to zero at block 132. Here, for instance, if a calculated position $p_{CALC}$ is within a few inches of a known possible stationary position $p_s$ (e.g., Position 9 in FIG. 1), processor 34 may be programmed to identify the possible stationary position $p_s$ and substitute that position value for the calculated position $p_{CALC}$. Here, where the position error of the methods and algorithms described above is less than half the distance between adjacent positions along shaft 22, the method of FIG. 12 will always reset position value to the correct value upon each stop of the elevator car on a floor. In this way, position value accuracy can be kept within one floor distance over theoretically an infinite period of time without requiring a synchronization switch or the like. At block 136, the current position $p_c$ is set equal to nearest known stationary position $p_s$. After block 136, control passes back to block 114 in FIG. 10.

Figure 13:
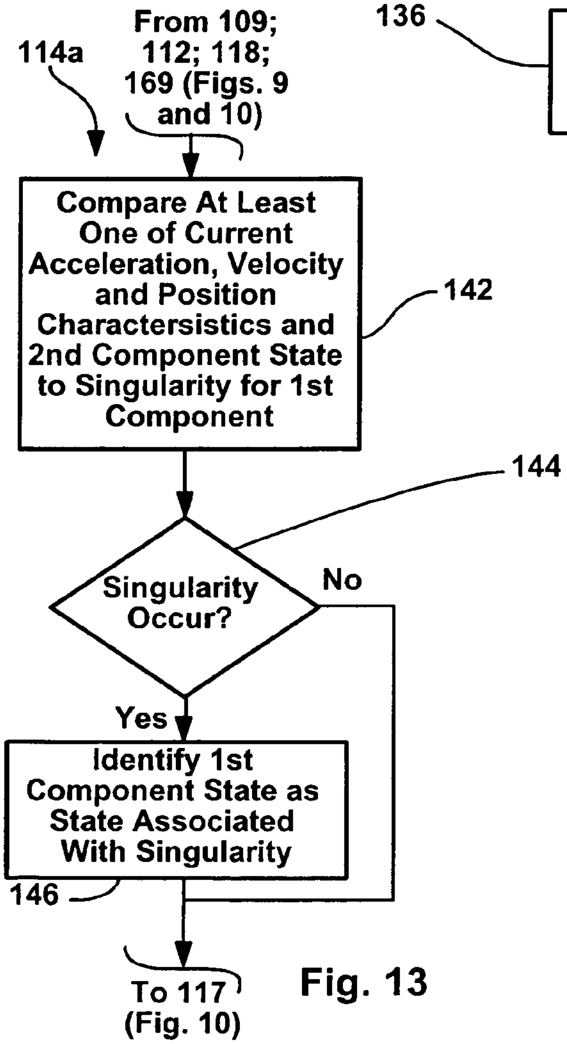
FIG. 13 is a subprocess that may be substituted for a portion of the process of FIG. 10.

Referring now to FIG. 13, a subprocess 114*a* that may be substituted for block 114 in FIG. 10 is illustrated. Referring also to FIGS. 9 and 10, after any of blocks 109, 112 or 118 or 169, control passes to block 142 where processor 34 compares at least one of the final acceleration, final velocity and final position characteristics or the state of a second component to a singularity associated with a first component. Where a singularity occurs at block 144, control passes to block 146. At block 146, processor 34 identifies the state of the first component as a state associated with the singularity that occurred at block 144. After block 146, control passes to block 117 in FIG. 10. Referring still to FIG. 13, where no singularity occurs at block 144, control passes to block 117 in FIG. 10.

An exemplary singularity for car 24 that may have been specified at block 52 may be that, when a current value of car acceleration $a_c$ exceeds 90% of a maximum car acceleration value, the car is in the accelerating state 304 (see again FIG. 5). Thus, where the 90% of maximum of acceleration condition occurs, the singularity would occur at block 144 and, at block 146, process 34 would identify that the car is in the accelerating operating state. Another exemplary singularity for car 24 may be that, when door 32 is in any of the opening state 324, the open state 326, the closing state 328 or the reopening state 330 (see again FIG. 7), the car 24 is in the standing state 302. Thus, where the singularity corresponding to door position and the standing car is met at block 144, processor 34 is programmed to identify that the cars current state is standing 302 (see again FIG. 5). Some of the singularities described here are illustrated in FIGS. 20 and 21. Many other component-to-component state singularities as well as to state-to-state singularities are contemplated and each may be separately implemented via a loop like subprocess 114*a* illustrated in FIG. 13.

Tests have revealed that, in certain situations, accelerometers used with elevators generate very noisy signals when elevator velocity is very close to zero. To this end, referring again to FIG. 19, it can be seen that when door velocity V is near a zero value, the acceleration value A generated by the accelerometers becomes very noisy (e.g., see value a at times 4.0 and 9.0). In these cases, while the acceleration values are clearly useful, they can be misinterpreted by the algorithm described above with respect to FIGS. 8 through 10 and can be classified incorrectly as noise. If velocity values are simply reset based on incorrect information and if the error is later revealed, the algorithm described above provides no way to restore the original velocity information and an error results. Here, it has been recognized that the longer the method described above detects absence of useful signal, the higher the probability that the signal is a noise signal. Based on this realization, in at least some embodiments of algorithms consistent with the present invention, when a velocity value is initially recognized as unclassified, the velocity value is slowly decreased toward a zero value and, as the duration of the unclassified signal continues, the rate of correction is increased.

Figure 14:
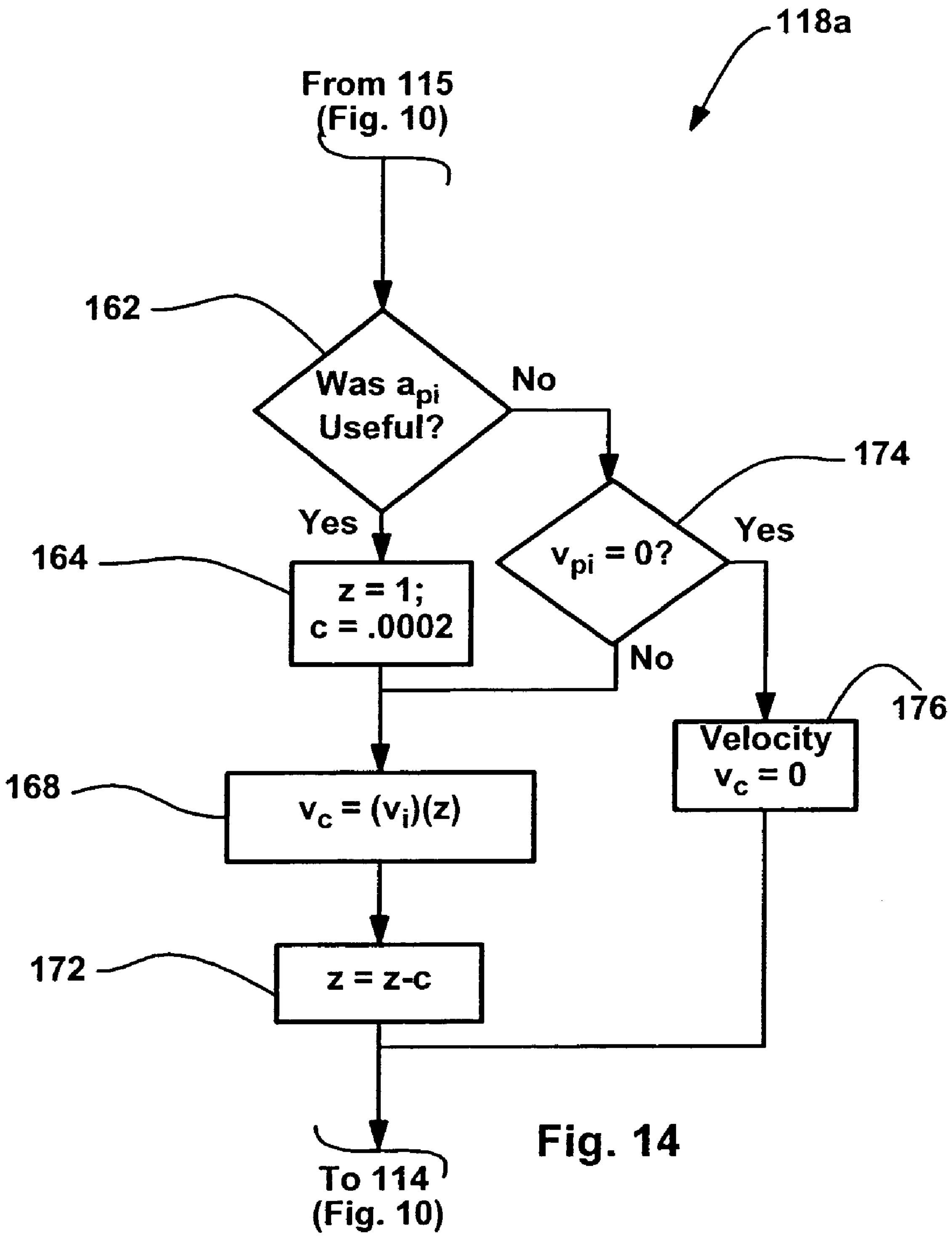
FIG. 14 is a subprocess that may be substituted for a portion of the process of FIG. 10.

Consistent with the above comments, FIG. 14 illustrates a subprocess 118*a* that may be substituted for block 118 in FIG. 10 to reduce the current velocity estimate $v_c$ over a short period to a zero value when unreliable or non-useful/acceleration values are generated. Referring also to FIG. 10, after block 115, control passes to block 162 where processor 34 determines whether or not the previous intermediate acceleration value $a_{pi}$ was useful. Where the previous intermediate acceleration value $a_{pi}$ was not useful, control passes to block 174 where processor 34 determines whether or not previous intermediate velocity value $v_{pi}$ was zero. Where the previous intermediate velocity value $v_{pi}$ was zero, control passes to block 176 where the current velocity value $v_c$ is set equal to zero. After block 176 control passes to block 114 in FIG. 10.

Referring still to FIG. 14, at block 174, where the previous intermediate velocity value $v_{pi}$ was other than zero, control passes to block 168. Referring again to block 162, where the previous intermediate acceleration value $a_{pi}$ was useful, control passes to block 164. At block 164, a z value is set equal to one and a c value is set equal to a positive fraction near a zero value. For instance, in the present example, value c is 0.0002. Here, value c should be selected as a function of the sampling frequency so that z is driven to a zero value in 1 to 3 seconds. In at least some cases the sampling frequency will be 200–500 Hz. After block 164, control passes to block 168. At block 168 current velocity value $v_c$ is determined by multiplying intermediate velocity value $v_i$ by value z. Continuing, at block 172, value z is reduced by value c (i.e., z=z−c). After block 172, control passes back to block 114 in FIG. 10.

Thus, it should be appreciated that each time through subprocess 118*a* of FIG. 14, value z is reduced by value c until current velocity value $v_c$ either naturally is driven to a zero value or is driven to a zero value by value z or, in the alternative, a previous intermediate velocity value $a_{pi}$ is identified as useful.

The problem of excessive noise at low velocity can also be solved by means of a memory buffer that stores a time series of input value samples thereby giving processor 34 additional time to determine what happens after first detection of the absence of useful velocity values, the processor then deciding whether or not to correct the buffered information. This solution may be advantageous for some applications but would require additional memory and would cause delays in output values that may be disadvantageous for other applications.

The accuracy of the above described algorithms and methods can cause situations where a position value reaches a physical boundary (e.g., the top Position 10 of the exemplary building) and the velocity $v_i$ is not zero, thus causing the position value to get outside the space of possible values. In this case, it has been recognized that there are two possibilities. First, the velocity value may be correct and the position value may be incorrect. Second, both the velocity value and the position value may be incorrect. While in the first case only the position value needs to be synchronized, in the second case both of the position and velocity values should be corrected. Here, it is not possible to recognize which of the two possibilities occurs solely based on the knowledge of the input signals available. Nevertheless, the probability of the first possibility decreases and the probability of the second possibility increases as time elapses from the moment when the position value reaches the physical boundary.

Based on the above realizations, the present invention contemplates at least two different ways to reduce position and velocity errors. First, after a physical boundary has been reached by a calculated position value, processor 34 may time-out a short period and then set the velocity value to zero if the velocity value has not converged to zero naturally. This solution, while effective for some applications, may cause discontinuities of the velocity value.

Second, after a boundary position has been reached, the velocity value may be modified in a manner similar to that described above with respect to FIG. 14. To this end, referring now to FIG. 15, a subprocess 112*a* that may be substituted for block 112 in FIG. 10 is illustrated. Referring also to FIG. 10, after intermediate velocity $v_i$ has been identified as useful or reliable, control passes to block 183 in FIG. 15. At block 183, intermediate velocity value $v_i$ and previous velocity values are integrated to identify an intermediate position value $p_i$. At block 182, intermediate position value $p_i$ is analyzed to determine whether or not intermediate position value $p_i$ is at or outside a boundary or limit position. Where intermediate position value $p_i$ is within and not at one of the boundary positions, control passes to block 185 where the current velocity value $v_c$ is set equal to the intermediate velocity value $v_i$ and the current position value $p_c$ is set equal to intermediate position value $p_i$. In the alternative, where the car is at or beyond a boundary position at block 182, control passes to block 187 where the current position value $p_c$ is set equal to the boundary position. After block 187, control passes to block 184 where processor 34 determines whether or not the previous position value $p_{pc}$ was at or beyond a boundary position. Where the previous position value $p_{pc}$ was at or beyond a boundary position, control passes to block 194 where processor 34 determines whether or not the previous velocity value $v_{pc}$ was zero. Where the previous velocity value $v_{pc}$ was zero, control passes to block 196 where processor 34 sets the current velocity value $v_c$ equal to zero. After block 196, control passes to block 197 where value z and value c are reset.

Referring again to block 194, where the previous velocity value $v_{pc}$ is other than zero, control passes to block 190. Referring once again to block 184, where the previous position value $p_{pc}$ was at a boundary position, control passes to block 186. At block 186, a value z is set equal to one and a decrementing value c is set equal to some small positive value close to zero. For example, in the present instance, value c is set equal to 0.00002. Continuing, at block 190, intermediate velocity $v_i$ is multiplied by the value z to identify current velocity $v_c$. At block 192, value z is reduced by value c (i.e., z=z−c). After block 192, control passes back to block 114 in FIG. 10.

Figure 15:
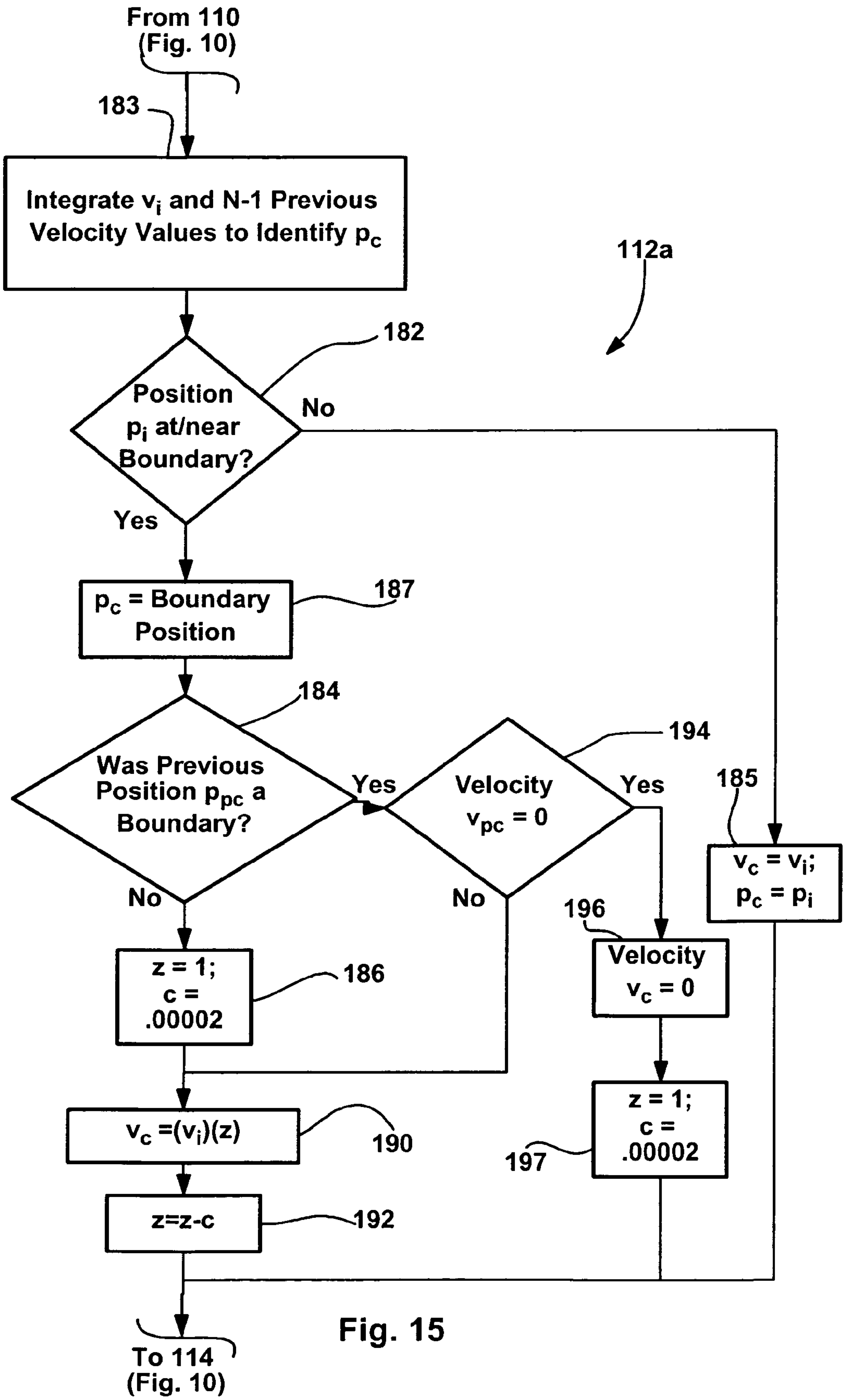
FIG. 15 is a subprocess that may be substituted for a portion of the process of FIG. 10.

Thus, it should be appreciated that each time through the subprocess 112*a* of FIG. 15, value z is reduced by value c until, eventually, value z is zero and the velocity value $v_c$ is driven to a zero value. It should also be appreciated that, if value $v_c$ naturally reaches a zero value prior to value z driving the velocity value $v_c$ to zero, the algorithm allows this activity.

The problem of a non-zero velocity when a boundary position is reached by car 24 can also be solved by providing a memory buffer that stores a time series of input signal samples giving processor 34 extra time to determine what happens after the boundary position is reached so that processor 34 can determine whether or not the intermediate velocity value is correct. While this solution has several advantages, this solution would require significantly greater memory and would cause a delay of output signals which could be disadvantageous in at least some applications.

One way to determine whether or not the software based modifier value $m_c$ is accurate is to use current position values $p_c$ to calculate a distance $d_{CALC}$ between car start and stop positions and compare the calculated distance value $d_{CALC}$ to a known distance $d_{REAL}$ between the two stationary start and stop positions. For example, referring again to FIG. 1, a measured real distance $d_{REAL}$ is identified between start Position 1 and stop Position 7 along shaft 22. A calculated distance $d_{CALC}$ can be determined by simply determining the distance between the calculated position $p_c$ at the start and stop positions of the car ride between positions 1 and 7.

Figure 16:
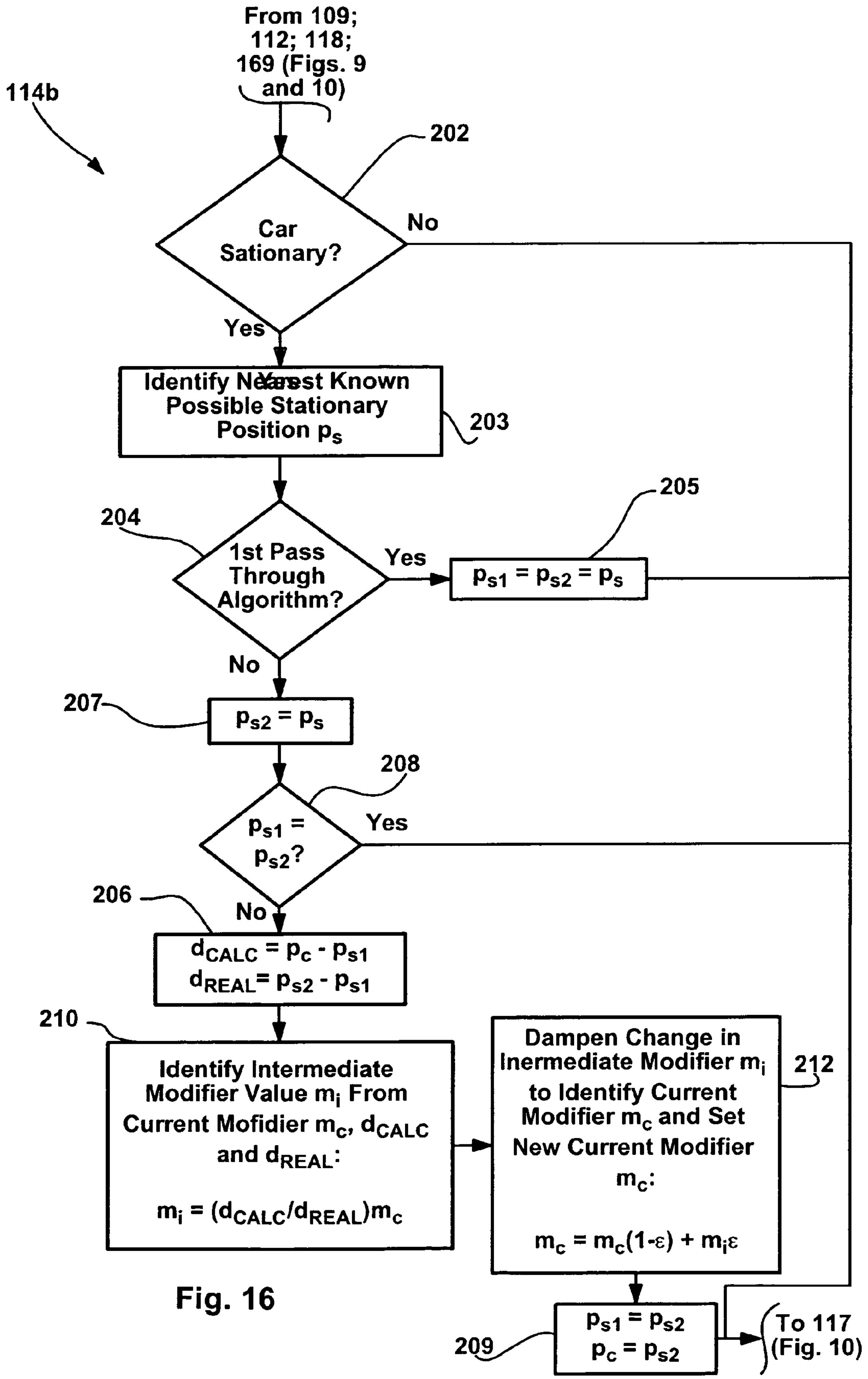
FIG. 16 is a subprocess that may be substituted for a portion of the process of FIG. 10.

A sub-process 114*b* for adjusting modifier value $m_c$ used by the processor 34 software is illustrated in FIG. 16 that may be substituted for block 114 in FIG. 10. Referring also to FIG. 10, after any of blocks 109, 112, 118 and 169, control passes to block 202 in FIG. 16. At block 202, processor 34 determines whether or not the car is stationary. If the car is not stationary, control passes back to block 117 in FIG. 10. If the car is stationary at block 202, processor 34 identifies the nearest known stationary position that occurs during normal elevator operation at block 203. Here, we note that when the algorithm 169*a* of FIG. 12 is also employed, the algorithms must be synchronized so that algorithm 114*b* is performed prior to algorithm 169*a* after each elevator ride so that algorithm 169*a* does not correct the position $p_c$ before position $p_c$ can be evaluated by algorithm 114*b*. At block 204, processor 34 determines if the current pass through blocks 203 through 204 is the first pass therethrough during the current determination of the calculated distance $d_{CALC}$. If the current pass is the first pass through blocks 203 and 204 during the current determination, control passes to block 205 where algorithms variables are initially set so that $p_{s1}=p_{s2}=p_s$. If the current pass is the second or subsequent pass through blocks 203 and 204 during the current determination, control passes to block 207 where position $p_{s2}$ is set equal to position $p_s$. At block 208, if $p_{s1}=p_{s2}$, then no car ride occurred between the current and the previous passes through algorithm 114*b* and there is no new information from which modifier $m_c$ can be updated. If position $p_{s1}$ is different than position $p_{s2}$ then a car ride occurred and the current value of modifier $m_c$ can be estimated.

Referring still to FIGS. 1 and 16, at block 206, processor 34 calculates distance $d_{CALC}$ which is based on the result of the double integration of the acceleration signals and $d_{REAL}$ which is the real or actual distance traveled by car 24 and which is calculated from known start and stop stationary positions (i.e., in the present example, Position 1 and Position 7 in FIG. 1). Continuing, at block 210, processor 34 identifies an intermediate modifier value $m_i$ by solving the following equation:

$$m_i = \left(\frac{d_{CALC}}{d_{REAL}}\right) m_c \qquad \text{Eq. 8}$$

where $d_{CALC}/d_{REAL}$ is a distance ratio. Next, at block 212, processor 34 dampens the change in the intermediate modifier value $m_i$ to identify a current modifier value $m_c$ and sets a new current modifier value $m_c$ by solving the following equation:

$$m_c = m_c(1-\epsilon) + m_i\epsilon \qquad \text{Eq. 9}$$

After block 212, control passes to block 209 which identifies the current stop position as future start position to ensure, in conjunction with block 208, that the ride just used to determine $d_{CALC}$ will not be processed again by algorithm 114*b*. At block 209 processor 34 also sets position value $p_c$ to the correct position (here algorithm 114*b* works as a complement of algorithm 169*a*). After block 209, control passes to block 117 in FIG. 10.

Figure 17:
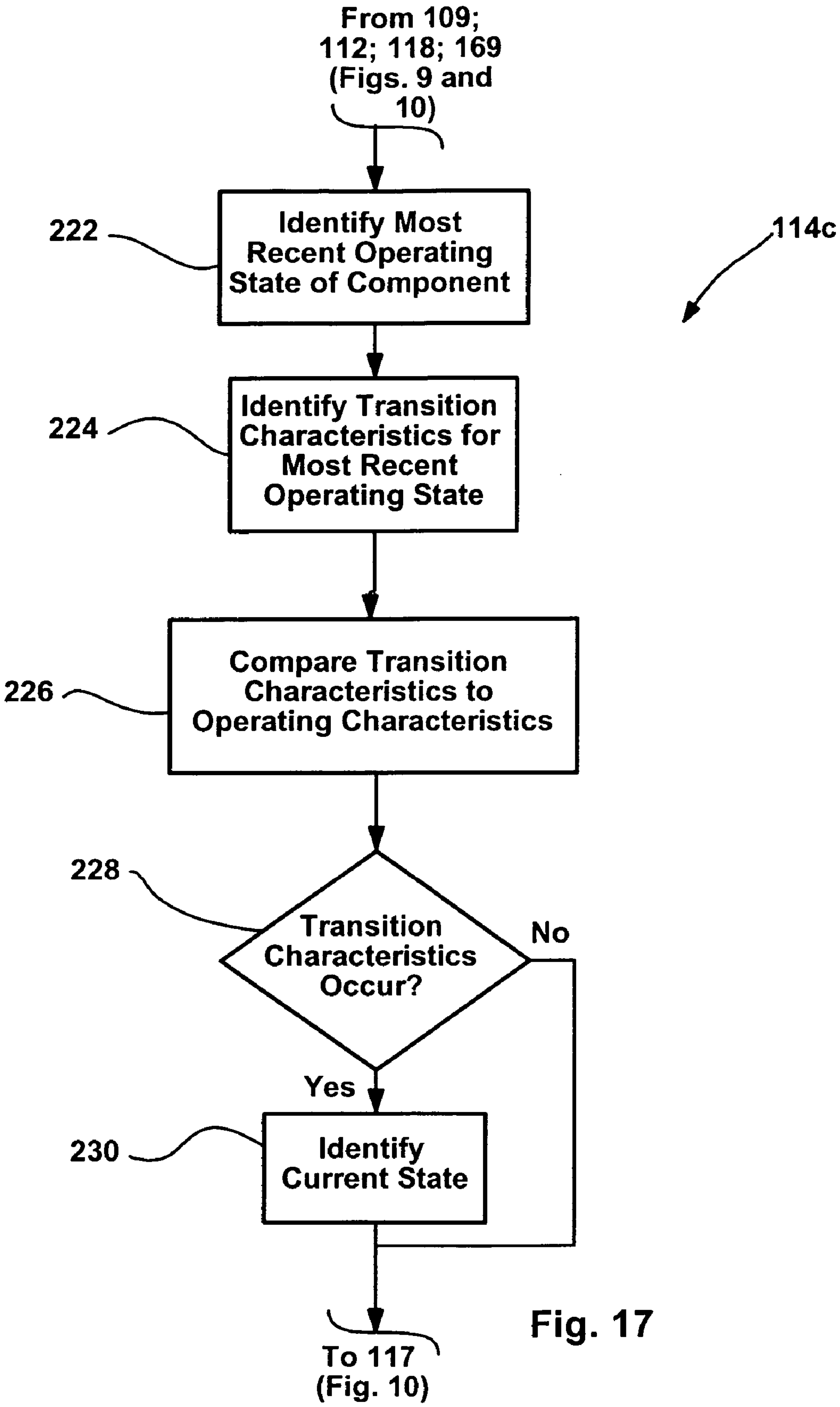
FIG. 17 is a subprocess that may be substituted for a portion of the process of FIG. 10.

According to at least some aspects of the present invention and in at least some embodiments of the present invention it is contemplated that knowledge about current operating states of components as well as about operating characteristics such as acceleration, velocity, etc., can be combined to identify component states and possible transitions. To this end, see again FIG. 20 that illustrates current states, possible next states and transition conditions that can be used to identify transition from a current state to another state. In addition, a subprocess 114*c* that may be substituted for block 114 in FIG. 10 is illustrated in FIG. 17 wherein recent component states and current operating characteristics are combined to identify current component states. Referring also to FIG. 10, after any of blocks 109, 112, 118 or 169, control may pass to block 222 in FIG. 17. At block 222, processor 34 identifies a most recent operating state of car 24. In this regard, referring once again to FIG. 6, the possible operating states includes standing 302, accelerating 304, constant speed 306, decelerating 308 and emergency stop 310. For the purposes of the present example, it will be assumed that the most recently identified state of car 24 is standing state 302. At block 324, processor 34 identifies transition characteristics for the most recent state. In the present case, the transition conditions in column 356 in FIG. 20 indicate acceleration $a_c$ greater than 90% of a maximum value $a_{max}$. At block 226, system operating characteristics (e.g., magnitude of acceleration in the present example) are monitored by processor 34 to identify the 0.90 ($a_{max}$) condition. Where the condition does not occur, control passes to block 117 in FIG. 10. Where the 0.90 ($a_{max}$) condition does occur, control passes to block 230 where processor 34 identifies the current state as accelerating.

While the invention may be susceptible to various modifications and alternative forms, specific embodiments have been shown by way of example in the drawings and have been described in detail herein. However, it should be understood that the invention is not intended to be limited to the particular forms disclosed. For example, while several of the methods and algorithms are described above as being separately performed, it should be appreciated that combinations of the methods and algorithms may be practiced simultaneously to achieve optimal results.

In addition, while some of the methods are described above as being performed when signals and values have certain classifications (e.g., as noise, unclassified or reliable) it should be appreciated that at least some of the methods may be performed when signals and values have other classifications. For instance, where acceleration values are classified as noise at block 100 in FIG. 9, in at least some cases a method akin to the sub-process of FIG. 14 may be performed after the acceleration values are integrated to identify velocity values.

Moreover, while the initial stationary period is manually identified by a commissioning engineer in the above described method (see block 56 in FIG. 8), in at least some embodiments it is contemplated that processor 34 could automatically identify an initial stationary period. Other ways of initially automatically determining if car 24 is stationary are contemplated.

Thus, the invention is to cover all modifications, equivalents, and alternatives falling within the spirit and scope of the invention as defined by the following appended claims.

To apprise the public of the scope of this invention, the following claims are made:

What is claimed is:

1. A method for use with an accelerometer that monitors movement of a machine component and generates acceleration values that include at least some noise associated therewith, the method for tracking machine component velocity via the acceleration values, the method comprising the steps of:

(a) obtaining acceleration values from the accelerometer during machine operation;

(b) analyzing the acceleration values to distinguish noise signals from non-noise signals wherein a noise signal is an acceleration value attributable to noise, wherein the step of analyzing the acceleration values to identify noise signals includes, while the component is stationary, obtaining a series of acceleration values, using the signal series to identify a current acceleration variance and comparing at least a derivative of the current acceleration variance with acceleration values acquired subsequent to the signal series to determine if signals acquired subsequent to the signal series are attributable to noise;

(c) using the non-noise signals to identify a component velocity value;

(d) outputting at least the component velocity value; and (e) performing a secondary function to identify component velocity when noise signals are identified.

2. The method of claim 1 wherein the step using the non-noise signals to identify the component velocity value includes integrating the non-noise signals.

3. The method of claim 2 wherein the step of performing a secondary function includes disabling the integration.

4. The method of claim 3 further including the step of integrating the component velocity values to identify an intermediate component position value, the step of performing a secondary function further including disabling the velocity integration.

5. The method of claim 4 further including the steps of specifying component boundary positions, determining if a component position value is outside the boundary positions, when a component position value is outside the boundary positions, replacing the component position value with one of the boundary positions.

6. The method of claim 4 further including the steps of specifying component boundary positions, determining if an integrated position value is one of at and outside the boundary positions, during a period when an integrated position value is one of at and outside the boundary positions and the velocity value is non-zero, modifying at least a subset of the velocity values.

7. The method of claim 6 wherein the step of modifying at least a subset of the velocity values includes, after the integrated position is one of at and outside the boundary positions for a predetermined duration, replacing the velocity value with a zero value.

8. The method of claim 7 wherein the step of modifying at least a subset of the velocity values includes, during the predetermined duration, reducing the velocity value as new acceleration values are obtained.

9. The method of claim 4 further including the steps of providing machine configuration information that specifies a stationary position subset indicating component positions that may occur when the component is stationary during normal machine operation, the step of performing a secondary function including replacing the intermediate component position with one of the position subset positions as a current component position when the component is stationary.

10. The method of claim 9 wherein the step of replacing includes identifying the position subset position that is nearest the intermediate component position and replacing the intermediate position with the identified position subset position as a current component position.

11. The method of claim 2 further including the step of determining if the acceleration value is reliable where reliable signals are attributable to other than noise, signals that are other than reliable signals and noise signals being unclassified signals, the method further including the steps of, for velocity values derived from unclassified acceleration values, after a predetermined period of unclassified acceleration values, modifying at least a subset of the velocity values.

12. The method of claim 11 wherein the step of modifying at least a subset of the velocity values includes, after the predetermined duration of unclassified acceleration values, replacing the velocity value with a zero value.

13. The method of claim 12 wherein the step of modifying at least a subset of the velocity values includes, during the predetermined duration, reducing the velocity value as new acceleration values are obtained.

14. The method of claim 11 wherein the step of determining if the acceleration value is reliable includes, while the component is stationary, obtaining a series of acceleration values, using the signal series to identify a current acceleration variance and comparing at least a derivative of the current acceleration variance with acceleration values acquired subsequent to the signal series to determine if signals acquired subsequent to the signal series are reliable.

15. The method of claim 14 wherein the step of comparing at least a derivative includes the steps of identifying at least a third acceleration threshold value as a function of the current acceleration variance and comparing acceleration subset signals that occur between variance updates to the most recent third acceleration threshold value.

16. The method of claim 15 wherein the step of identifying a third acceleration threshold value includes deriving a standard deviation from the current acceleration variance and multiplying the standard deviation by a scalar (x2), the step of comparing including comparing at least a subset of the acceleration subset signals that occurs between variance updates to the third acceleration threshold value to identify a ratio of acceleration subset signals that are greater than the third acceleration threshold value to the total number of acceleration subset signals compared to the third acceleration threshold value and, where the ratio is greater than a fourth acceleration threshold value, determining that the most recent acceleration value is reliable.

17. The method of claim 1 wherein the current acceleration variance is updated each time the component is stationary for a stationary period of at least a predetermined duration.

18. The method of claim 17 wherein the step of updating the current acceleration variance includes, for each stationary period, obtaining a new series of acceleration values during the stationary period and using the new series to identify an intermediate acceleration variance.

19. The method of claim 18 wherein the intermediate acceleration variance is used as the current acceleration variance.

20. The method of claim 18 wherein the current acceleration variance is determined by combining a previous current acceleration variance and the intermediate acceleration variance.

21. The method of claim 20 wherein the step of combining the previous and intermediate acceleration variances includes adding a fraction of the previous current acceleration variance and a complimentary fraction of the intermediate acceleration variance.

22. The method of claim 18 wherein the step of identifying an intermediate acceleration variance includes identifying a current acceleration bias associated with the series of acceleration values and mathematically combining the current acceleration bias and the series of acceleration values to identify the current acceleration variance.

23. The method of claim 22 wherein the step of using the new series to identify an intermediate acceleration variance includes using the new series to identify an intermediate acceleration bias, mathematically combining the intermediate acceleration bias and a previous acceleration bias to identify a new current acceleration bias, mathematically combining the new current acceleration bias and the new series of acceleration values to identify an intermediate acceleration variance and mathematically combining the intermediate acceleration variance and the previous current acceleration variance to generate a new current acceleration variance.

24. The method of claim 17 wherein the step of comparing at least a derivative includes the steps of identifying at least a first acceleration threshold value as a function of the current acceleration variance and comparing acceleration subset signals that occur between variance updates to the most recent first acceleration threshold value.

25. The method of claim 24 wherein the step of identifying a first acceleration threshold value includes deriving a standard deviation from the current acceleration variance and multiplying the standard deviation by a scalar (x1), the step of comparing including comparing at least a subset of the acceleration subset signals that occurs between variance updates to the first acceleration threshold value to identify a ratio of acceleration subset signals that are less than the first acceleration threshold value to the total number of acceleration subset signals compared to the first acceleration threshold value and, where the ratio is greater than a second acceleration threshold value, determining that the most recent acceleration value is a noise signal.

26. The method of claim 25 wherein, for each of the acceleration values, the step of comparing to the first acceleration threshold value is repeated using a different subset of acceleration values that immediately precedes the acceleration value.

27. The method of claim 1 wherein the component is one of an elevator car and an elevator door.

28. The method of claim 1 wherein the current acceleration variance is updated each time the component is stationary for a stationary period of at least a predetermined duration, the step of updating the current acceleration variance including, for each stationary period, obtaining a new series of acceleration values during the stationary period, using the new series to identify an intermediate acceleration variance and combining a previous current acceleration variance and the intermediate acceleration variance to provide a new current acceleration variance.

29. The method of claim 28 wherein the step of combining the previous and intermediate acceleration variances includes adding a fraction of the previous final acceleration variance and a complimentary fraction of the intermediate acceleration variance.

30. The method of claim 28 wherein the step of identifying an intermediate acceleration variance includes identifying a current acceleration bias associated with the series of acceleration values and mathematically combining the current acceleration bias and the series of acceleration values to identify the current acceleration variance.

31. A method for use with an accelerometer that monitors movement of a machine component and generates acceleration values that include at least some noise associated therewith, the method for tracking machine component velocity via the acceleration values, the method comprising the steps of:

(a) obtaining acceleration values from the accelerometer during machine operation;

(b) analyzing the acceleration values to distinguish noise signals from non-noise signals wherein a noise signal is an acceleration value attributable to noise;

(c) integrating the non-noise signals to identify a component velocity value;

(d) outputting at least the identified component velocity value;

(e) performing a secondary function to identify component velocity when noise signals are identified; and analyzing the velocity values to identify noise values where noise values are velocity values attributable to noise.

32. The method of claim 31 wherein the step of analyzing the velocity values to identify noise signals includes, while the component is stationary, generating a series of velocity values, using the value series to identify a current velocity variance and comparing at least a derivative of the current velocity variance with velocity values generated subsequent to the value series to determine if values acquired subsequent to the value series are attributable to noise.

33. The method of claim 32 wherein the step of comparing at least a derivative includes the steps of identifying at least a first velocity threshold value as a function of the current velocity variance and comparing velocity subset values that occur between variance updates to the most recent first velocity threshold value, the step of identifying a first velocity threshold value includes deriving a standard deviation from the current velocity variance and multiplying the standard deviation by a scalar (x3), the step of comparing including comparing at least a subset of the velocity subset values that occurs between variance updates to the first velocity threshold value to identify a ratio of velocity subset signals that are less than the first velocity threshold value to the total number of velocity subset values compared to the first velocity threshold value and, where the ratio is greater than a second velocity threshold value, determining that the most recent velocity value is a noise value.

34. The method of claim 31 further including the step of determining if the velocity value is reliable where reliable values are attributable to other than noise, values that are other than one of reliable values and noise values being unclassified values, the method further including the steps of integrating the reliable velocity values to identify component position values.

35. The method of claim 34 wherein the step of determining if the velocity values are reliable includes, while the component is stationary, generating a series of velocity values, using the value series to identify a current velocity variance and comparing at least a derivative of the current velocity variance with velocity values generated subsequent to the value series to determine if values acquired subsequent to the value series are reliable.

36. The method of claim 35 wherein the step of comparing at least a derivative includes the steps of identifying at least a third velocity threshold value as a function of the current velocity variance and comparing velocity subset values that occur between variance updates to the most recent third velocity threshold value, the step of identifying a third velocity threshold value includes deriving a standard deviation from the current velocity variance and multiplying the standard deviation by a scalar (x4), the step of comparing including comparing at least a subset of the velocity subset values that occurs between variance updates to the third velocity threshold value to identify a ratio of velocity subset signals that are less than the third velocity threshold value to the total number of velocity subset values compared to the third threshold value and, where the ratio is greater than a fourth velocity threshold value, determining that the most recent velocity value is reliable.

37. A method for use with an accelerometer that monitors movement of a machine component and generates acceleration values that include at least some noise associated therewith, the method for tracking machine component velocity via the acceleration values and determining the position of the component, the method comprising the steps of:

(a) obtaining acceleration values from the accelerometer during machine operation;

(b) analyzing the acceleration values to distinguish noise signals from non-noise signals wherein a noise signal is an acceleration value attributable to noise;

(c) integrating the non-noise signals to identify a component velocity value and integrating the component velocity values to identify an intermediate component position value;

(d) disabling the integrations when noise signals are identified; and storing at least a subset of the velocity values and the intermediate positions for subsequent use.

38. A method for use with an accelerometer that monitors movement of a machine component and generates acceleration values that include at least some noise associated therewith, the component having a plurality of operating states, the method for identifying operating states as a function of acceleration value characteristics and comprising the steps of:

(a) providing machine operating information specifying operating states and corresponding acceleration value characteristics;

(b) obtaining acceleration values during machine operation that indicate acceleration of the component;

(c) using the operating information and the acceleration values to identify a current operating state of the component;

(d) outputting at least the identified current operating state; and wherein the acceleration value characteristics specify relationships between the acceleration values and a maximum acceleration value during normal movement of the component.

39. The method of claim 38 wherein at least one of the specified relationships indicates an acceleration value above which it can be assumed that the component is moving.

40. A method for use with an accelerometer that monitors movement of a machine component and generates acceleration values that include at least some noise associated therewith, the method for identifying component velocity and comprising the steps of:

(a) obtaining acceleration values from the accelerometer during machine operation;

(b) analyzing the acceleration values to distinguish noise signals from non-noise signals wherein a noise signal is an acceleration value attributable to noise;

(c) integrating the non-noise signals to identify a component velocity value;

(d) disabling integration of the acceleration values when the acceleration values are noise signals; and specifying operating characteristics for the component;

identifying at least one current operating characteristic; outputting or storing at least one identified current operating characteristic;

determining when at least one of acceleration values, velocity values and positions are inconsistent with the at least one current operating characteristic; and when at least one of acceleration values, velocity values and positions are inconsistent with the at least one current operating characteristic, replacing at least one of the acceleration values, velocity values and positions with another value that is consistent with the current operating characteristic.

41. The method of claim 40 further including the steps of integrating the velocity values to identify component positions and, when the acceleration values are noise signals, disabling integration of the velocity values.

42. A method for use with an accelerometer that monitors movement of a machine component and generates acceleration values that include at least some noise associated therewith, the method comprising the steps of:

(a) obtaining acceleration values during machine operation that indicate acceleration of the component;

(b) analyzing the acceleration values to distinguish noise signals, reliable signals and unclassified signals wherein a noise signal is an acceleration value attributable to noise, a reliable signal that is attributable at least in part to other than noise and an unclassified signal is an acceleration value that is other than a noise value and a reliable signal;

(c) integrating the unclassified signals and the reliable signals to generate component velocity values;

(d) outputting at least the generated component velocity values; and (e) where the acceleration values are unclassified signals for a predetermined duration, modifying at least a subset of the velocity values.

43. A method for use with an accelerometer that monitors movement of a machine component and generates acceleration values that include at least some noise associated therewith, the method comprising the steps of:

(a) specifying machine operating characteristics that specify component boundary positions that indicate the positions of the component that cannot be surpassed during normal operation;

(b) obtaining acceleration values during machine operation that indicate acceleration of the component;

(c) integrating the acceleration values to identify integrated component velocity values;

(d) outputting at least the identified integrated component velocity values;

(e) integrating the velocity values to identify integrated component positions;

(f) determining when the component is one of at and outside a boundary position and the velocity value is non-zero; and (g) when the component is one of at and beyond a boundary position and the velocity value is non-zero, modifying at least a subset of the velocity values.

44. The method of claim 43 wherein the step of modifying at least a subset of the velocity values includes, after the integrated position is one of at and outside the boundary positions for a predetermined duration, replacing the velocity value with a zero value.

45. The method of claim 44 wherein the step of modifying at least a subset of the velocity values includes, during the predetermined duration, reducing the velocity value as new acceleration values are obtained.

* * * * *